United States Patent
Choi et al.

(10) Patent No.: US 12,199,271 B2
(45) Date of Patent: Jan. 14, 2025

(54) POROUS SILICON-CONTAINING COMPOSITE, CARBON COMPOSITE USING THE SAME, AND ELECTRODE, LITHIUM BATTERY AND ELECTRONIC DEVICE EACH INCLUDING THE SAME

(71) Applicants: Samsung Electronics Co., Ltd., Suwon-si (KR); Samsung SDI Co., Ltd., Yongin-si (KR)

(72) Inventors: Junghyun Choi, Yongin-si (KR); Inhyuk Son, Yongin-si (KR); Mijong Kim, Suwon-si (KR); Sangkook Mah, Seoul (KR); Jumyeung Lee, Suwon-si (KR); Minwoo Lim, Suwon-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/316,830

(22) Filed: May 12, 2023

(65) Prior Publication Data

US 2023/0282807 A1    Sep. 7, 2023

Related U.S. Application Data

(63) Continuation of application No. 16/595,751, filed on Oct. 8, 2019, now Pat. No. 11,695,107.

(30) Foreign Application Priority Data

Oct. 25, 2018    (KR) .................. 10-2018-0128321

(51) Int. Cl.
  *H01M 4/36*      (2006.01)
  *H01M 4/38*      (2006.01)
  (Continued)

(52) U.S. Cl.
  CPC .......... *H01M 4/364* (2013.01); *H01M 4/366* (2013.01); *H01M 4/386* (2013.01); *H01M 4/587* (2013.01);
  (Continued)

(58) Field of Classification Search
  CPC ............................................... H01M 10/0525
  See application file for complete search history.

(56) References Cited

U.S. PATENT DOCUMENTS 6,911,767 B2    6/2005    Takai
6,976,897 B2    12/2005   Choi et al.
(Continued)

FOREIGN PATENT DOCUMENTS

CN    102007625 A    4/2011
CN    103022453      4/2013
(Continued)

OTHER PUBLICATIONS

Japanese Office Action for Japanese Patent Application No. 2019-194574 dated Nov. 13, 2023.
(Continued)

*Primary Examiner* — Jayne L Mershon
(74) *Attorney, Agent, or Firm* — CANTOR COLBURN LLP

(57) ABSTRACT

A porous silicon-containing composite includes: a porous core including a porous silicon composite secondary particle; and a shell on at least one surface of the porous core, the shell including a first graphene, wherein the porous silicon composite secondary particle includes an aggregate of a first primary particle including silicon, a second primary particle including a structure and second graphene on at least one surface of the first primary particle and the second primary particle, and wherein at least one of a shape and a degree of oxidation of the first primary particle and the
(Continued)

second primary particle are different. Also an electrode including the porous silicon-containing composite, a lithium battery including the electrode, and a device including the porous silicon-containing composite or the carbon composite.

20 Claims, 14 Drawing Sheets

(51) Int. Cl.
    *H01M 4/587* (2010.01)
    *H01M 10/0525* (2010.01)
    *H01M 4/02* (2006.01)
(52) U.S. Cl.
    CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 7,009,331 B2 | 3/2006 | Sheu et al. | |
| 7,816,031 B2 | 10/2010 | Cui et al. | |
| 7,939,218 B2 | 5/2011 | Niu | |
| 8,241,793 B2 | 8/2012 | Zhamu et al. | |
| 8,367,244 B2 * | 2/2013 | Ramasubramanian . | H01M 4/36 429/231.1 |
| 8,753,545 B2 | 6/2014 | Obrovac et al. | |
| 8,999,583 B2 | 4/2015 | Hirose et al. | |
| 9,070,942 B2 | 6/2015 | Liu et al. | |
| 9,325,028 B2 | 4/2016 | Kwon et al. | |
| 9,331,338 B2 | 5/2016 | Hwang et al. | |
| 9,444,085 B2 | 9/2016 | Kwon et al. | |
| 9,536,735 B2 | 1/2017 | Son et al. | |
| 9,548,490 B2 | 1/2017 | Ku et al. | |
| 9,564,631 B2 | 2/2017 | Kim et al. | |
| 9,972,833 B2 | 5/2018 | Jung et al. | |
| 10,516,157 B2 | 12/2019 | Ogata et al. | |
| 10,622,624 B2 | 4/2020 | Son et al. | |
| 10,978,701 B2 | 4/2021 | Moon et al. | |
| 2006/0066217 A1 | 3/2006 | Son | |
| 2006/0134516 A1 | 6/2006 | Im et al. | |
| 2008/0160409 A1 | 7/2008 | Ishida et al. | |
| 2008/0187838 A1 | 8/2008 | Le | |
| 2008/0261116 A1 | 10/2008 | Burton et al. | |
| 2009/0057649 A1 | 3/2009 | Sutter et al. | |
| 2010/0081057 A1 | 4/2010 | Liu et al. | |
| 2010/0176337 A1 | 7/2010 | Zhamu et al. | |
| 2010/0193731 A1 | 8/2010 | Lee et al. | |
| 2010/0273058 A1 | 10/2010 | Lee et al. | |
| 2010/0288077 A1 | 11/2010 | Le | |
| 2010/0297502 A1 | 11/2010 | Zhu et al. | |
| 2010/0330421 A1 | 12/2010 | Cui et al. | |
| 2011/0159368 A1 | 6/2011 | Hirose et al. | |
| 2012/0021250 A1 | 1/2012 | Lee et al. | |
| 2012/0064409 A1 | 3/2012 | Zhamu et al. | |
| 2012/0121977 A1 | 5/2012 | Xu et al. | |
| 2012/0244428 A1 | 9/2012 | Park et al. | |
| 2013/0040201 A1 | 2/2013 | Manthiram et al. | |
| 2013/0045385 A1 | 2/2013 | Kim et al. | |
| 2013/0052537 A1 | 2/2013 | Takeuchi et al. | |
| 2013/0083496 A1 | 4/2013 | Franklin et al. | |
| 2013/0108907 A1 | 5/2013 | Bhardwaj et al. | |
| 2013/0130115 A1 | 5/2013 | Park et al. | |
| 2013/0134361 A1 | 5/2013 | Lee et al. | |
| 2013/0143120 A1 | 6/2013 | Ramasubramanian et al. | |
| 2013/0149605 A1 | 6/2013 | Kakehata et al. | |
| 2013/0209881 A1 * | 8/2013 | Do ..................... | H01M 4/366 429/231.9 |
| 2013/0273433 A1 | 10/2013 | Jouanneau-Si Larbi et al. | |
| 2014/0087255 A1 | 3/2014 | Kim et al. | |
| 2014/0255781 A1 | 9/2014 | Son et al. | |
| 2014/0255785 A1 * | 9/2014 | Do ...................... | C09D 7/61 429/232 |
| 2014/0287315 A1 | 9/2014 | Troegel et al. | |
| 2014/0302385 A1 | 10/2014 | Choi et al. | |
| 2014/0302395 A1 | 10/2014 | Fukuoka et al. | |
| 2014/0315086 A1 | 10/2014 | Put et al. | |
| 2014/0370387 A1 | 12/2014 | Anguchamy et al. | |
| 2015/0072204 A1 | 3/2015 | Kwon et al. | |
| 2015/0093648 A1 | 4/2015 | Son et al. | |
| 2015/0147649 A1 | 5/2015 | Jung et al. | |
| 2015/0243969 A1 | 8/2015 | Ku et al. | |
| 2015/0380728 A1 | 12/2015 | Son et al. | |
| 2016/0006024 A1 | 1/2016 | Xiao et al. | |
| 2016/0013481 A1 | 1/2016 | Jeong et al. | |
| 2016/0093879 A1 | 3/2016 | Song et al. | |
| 2016/0099463 A1 | 4/2016 | Lee et al. | |
| 2016/0256873 A1 | 9/2016 | Do et al. | |
| 2016/0315311 A1 | 10/2016 | Jeon et al. | |
| 2016/0344020 A1 | 11/2016 | Tzeng et al. | |
| 2016/0346769 A1 | 12/2016 | Kim et al. | |
| 2016/0365573 A1 | 12/2016 | Li et al. | |
| 2017/0194638 A1 | 7/2017 | Cho et al. | |
| 2017/0317352 A1 | 11/2017 | Lee et al. | |
| 2017/0324097 A1 | 11/2017 | Lee et al. | |
| 2017/0358797 A1 | 12/2017 | Son et al. | |
| 2018/0040882 A1 | 2/2018 | Kim et al. | |
| 2018/0040898 A1 | 2/2018 | Lee et al. | |
| 2018/0083272 A1 | 3/2018 | Son et al. | |
| 2018/0090802 A1 | 3/2018 | Kwon et al. | |
| 2018/0115006 A1 | 4/2018 | Lee et al. | |
| 2018/0145316 A1 | 5/2018 | Moon et al. | |
| 2018/0307084 A1 | 10/2018 | Lee et al. | |
| 2019/0207221 A1 | 7/2019 | Son et al. | |

FOREIGN PATENT DOCUMENTS

| | | |
|---|---|---|
| CN | 103682359 A | 3/2014 |
| CN | 103730644 A | 4/2014 |
| CN | 103857623 A | 6/2014 |
| CN | 106953068 A | 7/2017 |
| CN | 107845785 A | 3/2018 |
| CN | 108075117 A | 5/2018 |
| EP | 2768050 A1 | 8/2014 |
| EP | 2854204 A1 | 4/2015 |
| JP | 2007123255 A | 5/2007 |
| JP | 2011233497 A | 11/2011 |
| JP | 2013258032 A | 12/2013 |
| JP | 2018048070 A | 3/2018 |
| KR | 1020070026699 A | 3/2007 |
| KR | 1020110039568 A | 4/2011 |
| KR | 1020110124728 A | 11/2011 |
| KR | 1020120027369 A | 3/2012 |
| KR | 1020130004536 A | 1/2013 |
| KR | 1020130005102 A | 1/2013 |
| KR | 1020130016727 A | 2/2013 |
| KR | 1020130033733 A | 4/2013 |
| KR | 1020130094366 A | 8/2013 |
| KR | 1020140035689 A | 3/2014 |
| KR | 1020140036495 A | 3/2014 |
| KR | 20140044570 A | 4/2014 |
| KR | 101396521 B1 | 5/2014 |
| KR | 1020140061955 A | 5/2014 |
| KR | 1020140077622 A | 6/2014 |
| KR | 1020140110703 A | 9/2014 |
| KR | 1020140111548 A | 9/2014 |
| KR | 1020140121096 A | 10/2014 |
| KR | 1020150015086 A | 2/2015 |
| KR | 1020150039555 A | 4/2015 |
| KR | 1020150063620 A | 6/2015 |
| KR | 1020150128592 A | 11/2015 |
| KR | 20150141154 A | 12/2015 |
| KR | 1020150141924 A | 12/2015 |
| KR | 1020160008041 A | 1/2016 |
| KR | 1020160085834 A | 7/2016 |
| KR | 1020170018350 A | 2/2017 |
| KR | 1020170069042 A | 6/2017 |
| KR | 101772659 B1 | 8/2017 |
| KR | 101818813 B1 | 1/2018 |
| KR | 1020180031566 A | 3/2018 |
| KR | 1020180031585 A | 3/2018 |

(56) References Cited

FOREIGN PATENT DOCUMENTS

| KR | 1020180119728 A | 11/2018 |
|---|---|---|
| KR | 101955531 B1 | 2/2019 |
| KR | 1020190083613 A | 7/2019 |

OTHER PUBLICATIONS

Choi et al., "Fading machanisms of carbon-coated and disproportionated Si/SiOx nagative electrode (Si/SiOx/C) in Li-ion secondary batteries: Dynamics and component analysis by TEM", Electrochimica Acta 85, 2012, 369-376.

H. Medina, et al., "Metal-Free Growth of Nanographene on Silicon Oxides for Transparent Conducting Applications," Advanced Functional Materials 2012, 22, pp. 2123-2128.

Hu et al., "Superior Storage Performance of a Si@SiOx/C Nanocomposite as Anode Material for Lithium-Ion Batteries** ", Angew. Chem. Int. Ed., vol. 47, 2008, pp. 1645-1649.

Hui Wu, et al., "Stable cycling of double-walled silicon nanotube battery anodes through solid-electrolyte interphase control," Nature Nanotechnology, vol. 7, May 2012, pp. 310-315.

Hyung Mo Jeong, et al., "Silicon@porous nitrogen-doped carbon spheres through a bottom-up approach are highly robust lithium-ion battery anodes," RSC Advances, 2012, 2, pp. 4311-4317.

J. Luo et al., Crumpled Graphene-Encapsulated Si Nanoparticles for Lithium Ion Battery Anodes, Journal of Physical Chemistry Letters, vol. 3, Issue 13, Jul. 5, 2012, pp. 824-1829.

Jianyi Chen, et al., "Oxygen-Aided Synthesis of Polycrystalline Graphene on Silicon Dioxide Substrates," Journal of the American Chemical Society 2011, 133, pp. 17548-17551.

K-S Kim et al., Chemical Vapor Deposition-Grown Graphene: The thinnest solid lubricant, ACS NANO, vol. 5, Issue 6, Jun. 2011, pp. 5107-5114.

Li et al., "Encapsulated within graphene shell silicon nanoparticles anchored on vertically aligned graphene trees as lithium ion battery anodes", Nano Energy, 5, 2014, 105-115.

Li et al., "Flexible graphene-based lithium ion batteries with ultrafast charge and discharge rates", PNAS, vol. 109, No. 43, Oct. 23, 2012, 17360-17365.

Liu et al., "A Yolk-Shell Design for Stabilized and Scalable Li-Ion Battery Alloy Anodes", NANO Letters, American Chemical Society, 2012. p. 1-7.

S. Kataria et al., Raman imaging on high-quality graphene grown by hot-filament chemical vapor deposition, Journal of Raman Spectroscopy, vol. 43, Aug. 1, 2012, pp. 1864-1867.

Shao-long Wu, et al., "Tunable synthesis of carbon nanosheet/silicon nanowire hybrids for field emission applications," Diamond & Related Materials 26 (2012) pp. 83-88.

Sim et al., Critical Thickness of SiO2 Coating Layer on Core@Shell Bulk@ Nanowire Si Anode Materials for Li-lon Batteries, Advanced Materials, 2013, 25, 4498-4503.

Son et al., "Graphene Coating of Silicon Nanoparticles with CO2-Enhanced Chemical Vapor Deposition", Materials Views, small-journal 12, No. 5, 2016, pp. 658-667.

Son et al., Silicon carbide-free graphene grown on silicon for lithium-ion battery with high volumetric energy density, Nature Comm, 2015, 6, 7393 2015, pp. 1-8.

Yuanhua Zhu, et al., "Directing Silicon-Graphene Self-Assembly as a Core/Shell Anode for High-Performance Lithium-Ion Batteries," Langmuir 2013, 29, pp. 744-749.

Tae Park et al., "Controlled growth of core-shell Si-SiOx and amorphous SiO2 Nanowires directly from NiO/Si", Nanotechnology, 145, 2004 S365-S370.

Wu et al., "Graphene/metal oxide composite electrode materials for energy storage", Nano Energy, 1, 2012, 107-131.

Yan Yao, "Interconnected Silicon Hollow Nanospheres for Lithium-Ion Battery Anodes with Long Cycle Life," Nano Letters 2011, 11, pp. 2949-2954.

Chinese Office Action for Chinese Patent Application No. 201910961964.5 dated Jan. 4, 2024.

\* cited by examiner

POROUS SILICON-CONTAINING COMPOSITE, CARBON COMPOSITE USING THE SAME, AND ELECTRODE, LITHIUM BATTERY AND ELECTRONIC DEVICE EACH INCLUDING THE SAME

CROSS-REFERENCE TO RELATED APPLICATION

This application is a continuation application of U.S. patent application Ser. No. 16/595,751, filed on Oct. 8, 2019, in the U.S. Patent and Trademark Office, and claims priority to and the benefit of Korean Patent Application No. 10-2018-0128321, filed on Oct. 25, 2018, in the Korean Intellectual Property Office, and all the benefits therefrom under 35 U.S.C. § 119, the content of which is incorporated herein in its entirety by reference.

BACKGROUND

1. Field

The present disclosure relates to a porous silicon-containing composite, a carbon composite using the porous silicon-containing composite, and an electrode, a lithium battery and an electronic device, each including the porous silicon-containing composite.

2. Description of the Related Art

Among negative active materials for lithium-ion batteries, silicon has a high theoretical capacity of 4,200 mAh/g and a low cost, and thus has been actively studied for its use as a negative electrode material. However, silicon may undergo a large volume expansion as a $Li_{4.4}Si$ alloy is generated during charge of a battery, and thus an electrically isolated active material may be generated in the electrode. Furthermore, an increase in the specific surface area of the active material may accelerate an electrolyte decomposition reaction. To address these drawbacks, developing a structure to suppress volume expansion of silicon and pulverization that occurs during the volume expansion of silicon, and forming a coating layer of, for example, carbon on surfaces of silicon, have been suggested.

However, currently available silicon materials are still not satisfactory in terms of their effects on volume expansion reduction and charging and discharging efficiency of batteries. Thus there remains a need for an improved negative active material.

SUMMARY

Provided is a porous silicon-containing composite.

Provided is a carbon composite including the porous silicon-containing composite and a carbonaceous material.

Provided is a lithium battery having improved lifetime, capacity, and efficiency by employing an electrode including the porous silicon-containing composite or the carbon composite including the porous silicon-containing composite and a carbonaceous material.

Provided is a device including the porous silicon-containing composite or the carbon composite including the porous silicon-containing composite or a carbonaceous material.

Additional aspects will be set forth in part in the description which follows and, in part, will be apparent from the description, or may be learned by practice of the presented embodiments.

According to an aspect of an embodiment, a porous silicon-containing composite includes: a porous core including a porous silicon composite secondary particle; and a shell on at least one surface of the porous core, the shell including a first graphene, wherein the porous silicon composite secondary particle includes an aggregate of a first primary particle including silicon, a second primary particle including a structure, and a second graphene on at least one surface of the first primary particle and the second primary particle, and wherein at least one of a shape and a degree of oxidation of the first primary particle and the second primary particle are different.

In an embodiment, the structure may include silicon, germanium (Ge), tin (Sn), aluminum (Al), zinc (Zn), antimony (Sb), an alloy thereof, or a combination thereof.

The structure may be silicon.

According to an aspect, a method of preparing a porous silicon-containing composite includes: contacting a first primary particle having a first shape and a first degree of oxidation and a second primary particle having a second shape and a second degree of oxidation, wherein at least one of the first and second shapes or the first and second degrees of oxidation are different, to form a porous silicon secondary particle; and heat treating the porous silicon secondary particle and the carbon source gas to prepare the porous silicon-containing composite.

According to an aspect, an electrochemical active material composite includes: an electrochemical active material; and the porous silicon-containing composite wherein the porous silicon-containing composite is on a surface of the electrochemical active material.

An electrode includes the porous silicon-containing composite.

According to an aspect, a carbon composite includes the porous silicon-containing composite and a carbonaceous material.

According to an aspect, a lithium battery includes the electrode.

According to an aspect, a device includes: the porous silicon-containing composite.

In an embodiment, the device may be a field-emission device, a biosensor, a semiconductor device, or a thermoelectric device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
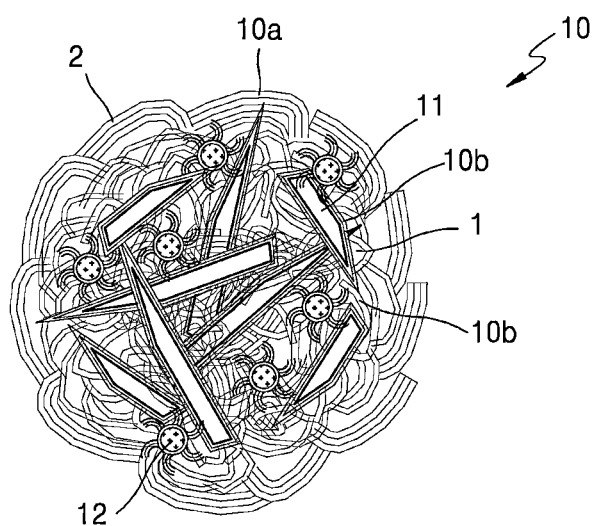
FIG. 1 is a schematic view illustrating an embodiment of a structure of a porous silicon-containing composite.

Reference will now be made in detail to embodiments, examples of which are illustrated in the accompanying drawings, wherein like reference numerals refer to like elements throughout. In this regard, the disclosed embodiment may have different forms and should not be construed as being limited to the description set forth herein. Accordingly, the embodiment is merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer" or "section," discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "graphene" as used in the present specification means a polycyclic aromatic molecule formed from a plurality of carbon atoms which are covalently bound to each other. The covalently bound carbon atoms may form a six-membered ring as a repeating unit, and may further include at least one of a five-membered ring and a seven-membered ring. Accordingly, graphene comprises a single layer of covalently bonded carbon atoms having sp2 hybridization. A plurality of graphene layers is often referred to in the art as graphite. However, for convenience, "graphene" as used herein may be a single layer, or also may comprise a plurality of layers of carbon, e.g., 1 to 100 layers, or 1 to 30 layers of carbon. Thus graphene, as used herein, may have a multiply layered structure formed by stacking single layers of graphene.

Hereinafter, an embodiment of a porous silicon-containing composite, an electrode including an electrode active material including the porous silicon-containing composite, a lithium battery including the electrode, and a device using the porous silicon-containing composite will be described in greater detail.

According to an aspect, a porous silicon-containing composite includes: a porous core including a porous silicon composite secondary particle; and a shell on at least one surface of the porous core, the shell including a first graphene, wherein the porous silicon composite secondary particle includes an aggregate of a first primary particle including silicon, a second primary particle including a structure, and a second graphene on at least one surface of the first primary particles and second primary particle, and wherein at least one of a shape and a degree of oxidation of the first primary particle and the second primary particle are different.

The porous core may include at least one porous silicon composite secondary particle.

The structure may include silicon (Si), germanium (Ge), tin (Sn), aluminum (Al), zinc (Zn), antimony (Sb), an alloy thereof, or a combination thereof. In an aspect, the structure may consist of silicon (Si). In an aspect, the structure consists of a silicon suboxide ($SiO_x$).

For example, the second primary particle may be different from the first primary particle in terms of a shape and degree of oxidation.

The first primary particle may have an oxygen content of about 3 atomic percent (atomic %) to about 15 atomic %, about 4 atomic % to about 13 atomic %, or about 5 atomic % to about 10 atomic %, based on a total content of the first primary particle, and a relatively high degree of oxidation. The first primary particle is for example, a first silicon. When the second primary particle is a silicon-comprising structure comprising a second silicon, the second primary particle may have an oxygen content of about 0.01 atomic % or greater to less than 3 atomic % and a degree of oxidation which is less than the first primary particle. For example, the first primary particle may have an oxygen content of about 4 atomic % to about 8 atomic %, or, about 3 atomic % to about 5 atomic %, based on a total content of the first primary particle. For example, the second primary particle may have an oxygen content of about 0.1 atomic % to about 2 atomic %, for example, about 1 atomic % to about 1.5 atomic %, based on a total content of the second primary particle.

The degree of oxidation of the first primary particle and the second primary particle may be inversely proportional to the size of the first primary particle and the second primary particle, respectively.

The shapes of the first primary particle and the second primary particle may not be specifically limited.

The first primary particle may have a plate shape, a needle shape, a cube-like shape, or a rod shape, or a combination thereof. The second primary particle may have, for example, a spherical form or a nanowire form.

When the second primary particle may have a spherical form, or a nanowire form.

The first primary particle may have a plate shape, a needle shape, or a combination thereof. The second primary particle may have a spherical shape. Preparation methods of the first primary particle and the second primary particle are not specifically limited. For example, the first primary particle may be prepared by crushing or grinding. For example, the second primary particle may be prepared by a vapor phase synthesis method.

The first primary particle and the second primary particle may have different shapes from each other. The porous silicon-containing composite may further include a third primary particle including silicon, the third primary particle having a nanotube shape, a nanorod shape, a wafer shape, a nanoribbon shape, or a combination thereof. The second primary particle may form a network by connection with the first primary particle.

The first primary particle may have a plate shape, a needle shape, or a combination thereof, and the second primary particle may have a spherical shape. The first primary particle, as silicon obtained by crushing a silicon source, may have a high degree of oxidation due to contact with heat and air during the crushing of the silicon source.

To provide improved active material characteristics including improved capacity and improved lifetime characteristics, in the porous silicon-containing composite including the silicon composite primary particles including the first primary particle, it is preferred to reduce a size of the first primary particle to about 80 nanometers (nm) or less. However, due to a limitation of the crushing process, this may increase the time and power to reduce the particle size of the first primary particle to 100 nm or less, consequently leading to a remarkably increased preparation cost and time. Accordingly, it is not practical or easy to reduce the particle size to an appropriate size. In addition, due to the increase in the degree of oxidation of the first primary particle which occurs during the crushing process, capacity and initial efficiency characteristics of a battery may be limited.

In addition, due to a large specific surface area of the first primary particle, it is preferred to suppress a side reaction of the porous silicon-containing composite including the first primary particle with electrolyte.

To address these problems with use of the silicon composite primary particles including the first primary particle in order to manufacture a lithium battery having improved specific capacity and initial efficiency without reduction in lifetime, the inventors used a second primary particle together with the first primary particle, the second primary particle having a different degree of oxidation and/or a different shape from those of the first primary particle. The second primary particle may be prepared by a vapor deposition method. Silicon having a size of tens of nanometers may be obtained by using the second primary particle, and the second primary particle may have a lower degree of oxidation than the first primary particle since oxidation does not occur during preparation of the second primary particle. The second primary particle may have a low degree of oxidation as described above, but have a large specific surface area. The second primary particle has a limitation in commercialization due to a high manufacturing cost. A porous silicon-containing composite obtained using such a second primary particle may have a lower degree of oxidation, as compared with a porous silicon-containing composite prepared using the first primary particle, and a high specific capacity, but a large specific surface area and a low initial efficiency. Accordingly, the porous-silicon-containing composite using the second primary particle may be deteriorated during repeated charging and discharging, so that initial efficiency and lifetime characteristics of a battery may be unsatisfactory.

Hence, the porous silicon-containing composite according to one or more embodiments may be prepared using the first primary particle and the second primary particle as described above together to provide a desired smaller size, excellent specific surface area, and improved specific capacity, initial efficiency and capacity characteristics.

A mixed weight ratio of the first primary particle to the second primary particle may be about 1:99 to about 99:1, for example, about 10:90 to about 90:10, and for example, about 90:10 to about 50:50.

The porous silicon-containing composite may use two types of primary particles including silicon as described above together, or three or more types of primary particles including silicon may be used. For example, the plurality of types of silicon may be different in degree of oxidation and/or shape.

The porous silicon-containing composite may further include, for example, a third primary particle in the shape of nanotubes, nanorods, nanoribbons, or a combination thereof.

The porous silicon-containing composite may further include a silicon suboxide of the formula $SiO_x$ (wherein $0<x<2$) between the silicon and the second graphene. The silicon suboxide may be in the form of a film or a matrix.

The first graphene and the second graphene may be in the form of a film, particles, a matrix, or a combination thereof. The first graphene and the second graphene may be the same.

As used herein, the term "silicon suboxide" may be a single composition represented by $SiO_x$ (wherein $0<x<2$) or may be a composition including, for example, Si and $SiO_2$ to have an average composition represented by $SiO_x$ (wherein $0<x<2$). For example, the silicon suboxide may include $SiO_2$.

In the porous silicon-containing composite according to one or more embodiments, a total amount of the silicon, i.e., a total amount of the first primary particle and the second primary particle may be about 0.01 parts to about 99 parts by weight, for example, about 0.01 parts to about 40 parts by weight, each with respect to 100 parts by weight of a total weight of the porous silicon-containing composite. When the total amount of the silicon is within these range, a lithium battery including the porous silicon-containing composite may have improved specific capacity, initial efficiency and lifetime characteristics.

The porous silicon-containing composite may further include a carbonaceous coating layer on at least one surface thereof. The densities of the porous silicon-containing composite and the carbonaceous coating layer may be evaluated by measurement of, for example, porosities of the porous silicon-containing composite and the carbonaceous coating layer, respectively. For example, the density of the porous silicon-containing composite may be the same as or smaller than the density of the carbonaceous coating layer.

The porous silicon-containing composite may have reduced porosity and an increased density, as compared with a porous silicon-containing composite including only the first primary particle. The porous silicon-containing composite according to one or more embodiments may have a porosity of about 60% or less, for example, about 30% to about 60%, or may have a non-porous structure. As used herein, the non-porous structure may refer to a structure having a porosity of about 10% or less, for example, about 5% or less, for example, about 0.01% to about 5% or less, or for example, 0%. The porosity may be measured by Hg porosimetry.

The second primary particle may have a size which is the same as or smaller than that of the first primary particle. The sizes of the first primary particle and the second primary particle may each independently have an average particle diameter of about 10 nm to about 30 micrometer (μm). The size of the first primary particle may be, for example, about 20 nm to about 180 nm, for example, about 60 nm to about 150 nm. The size of the second primary particle may be about 100 nm or less, for example, about 30 nm to about 100 nm.

The first primary particle may be in the form of needle-like particles. For example, the needle-like silicon particles may have a length of about 100 nm to about 160 nm, and in some embodiments, about 108 nm to about 125 nm; and may have a thickness of about 10 nm to about 100 nm, and in some embodiments, about 20 nm to about 50 nm, and in some other embodiments, about 40 nm.

The sizes of the first primary particle and the second primary particle may refer to average particle diameters of the first primary particle and the second primary particle, respectively, when the first primary particle and the second primary particle are spherical particles, and may refer to lengths of the major axes, lengths, or thicknesses of the first primary particle and the second primary particle, respectively, when the first primary particle and the second primary particle are non-spherical particles, for example, plate shaped particles or needle shaped particles. The second graphene (second graphene A) in a form of about 1 to about 30 layers is located on the first primary particle, and silicon, and the second graphene (second graphene B) in a form of about 1 to about 5 layers is located on the second primary particle. The second graphene in the form of flakes is located on the second graphene (second graphene A) and the second graphene (second graphene B). Since the first primary particle and the second primary particle have different shapes and/or different degrees of oxidation, the second graphene on the first primary particle and the second graphene on the second primary particle may be of different types.

For example, the first graphene and the second graphene may each be a polycyclic aromatic molecule including a plurality of carbon atoms covalently bonded to one another, and the covalently bonded plurality of carbon atoms may form a 6-membered ring as a basic repeating unit, but a 5-membered ring and/or a 7-membered ring may be included in the first or second graphene. Accordingly, the first or second graphene may be a single layer of the covalently bonded carbon atoms (in general, having a $sp^2$ bond). The first and second graphene may include a single layer or multiple layers of carbon stacked upon one another, for example, one layer to about 100 layers, about 2 layers to about 100 layers, or about 3 layers to about 50 layers.

The first graphene and the second graphene may each have a structure of a nanosheet, a layer (or film), a nanographene nanosheet, or flakes. As used herein, the term "nanosheet" may refer to a structure of graphene in an irregular form on the silicon suboxide. The term "layer (or film)" may refer to a continuous, uniform layered structure of graphene on the silicon suboxide.

FIG. 1 is a schematic view illustrating a structure of a porous silicon-containing composite 10 according to an embodiment. The porous silicon-containing composite may be in the form of, for example, a cluster. As used herein, the term "cluster" may refer to an aggregate of at least one or more primary particles, and may be construed as having substantially the same meaning as "secondary particle."

Referring to FIG. 1, the porous silicon-containing composite 10 may include a core 1 including a porous silicon composite secondary particle(s), and a shell 2 on the core 1, the shell 2 including a first graphene 10a.

The porous silicon composite secondary particle may include an aggregate of at least two silicon composite primary particles. The silicon composite primary particles may include first primary particle 11, second primary particle 12, and second graphene 10b on the first primary particle 11 and the second primary particle 12. The first primary particle 11 is for example the first silicon, and the second primary particle 12 is for example the second silicon.

The second graphene 10b of the silicon composite primary particles may form the shell 2 on a surface of silicon suboxide, and first graphene 10a of the silicon composite secondary particles may form the shell 2 on the core 1. Accordingly, the porous silicon-containing composite 10 may have a double core/shell structure. As the porous silicon-containing composite 10 has such a double core/shell structure, volume expansion may be suppressed, with a reduced side reaction with electrolyte.

The first primary particle 11 and the second primary particle 12 may form a network. The second primary particle 12 as a structure as described above may be embedded among the first primary particle. Due to having this structure, the porous silicon-containing composite 10 may have improved physical properties and an increased density due to reduced voids.

A silicon suboxide (SiO$_x$) (wherein 0<x<2) may further be on the first primary particle 11 and the second primary particle 12. The second graphene 10b may be on the silicon suboxide (SiO$_x$) (wherein 0<x<2).

Figure 2:
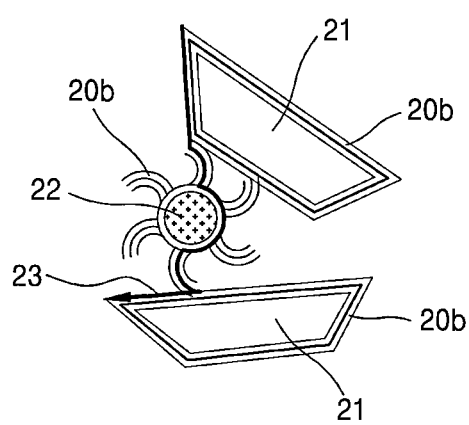
FIG. 2 is a schematic view illustrating an embodiment of a structure of silicon composite primary particle of the porous silicon-containing composite of FIG. 1.

FIG. 2 is a schematic view illustrating a partial structure of the silicon composite primary particles constituting the porous silicon-containing composite illustrated in FIG. 1.

First primary particle 21 may have a flake and needle shape, with second graphene 20b thereon. As illustrated in FIG. 2, the second graphene 20b may disposed on the first primary particle 21. A second graphene in the form of a layer may dispose on the second primary particle 22, and a second graphene in the form of flakes may dispose on the second graphene in the form of the layer. As such, the second graphene 20b include a second graphene in the form of a layer disposed on the second primary particle 22, and a second graphene in the form of flakes disposed on the second graphene in the form of the layer.

A silicon suboxide may further be on the first primary particle 21 and the second primary particle 22.

The porous silicon-containing composite according to one or more embodiments may include both the first primary particle 21 and the second primary particle 22 as illustrated in FIG. 2, and have a structure in which the second primary particle 22 is among the first primary particle 21, and thus may have a reduced specific surface area, as compared with a porous silicon-containing composite including only first primary particle, and have a reduced area of side reaction with liquid electrolyte, resulting in an increased binding strength of particles. As a result, a lithium battery including the porous silicon-containing composite according to one or more embodiments may have improved initial efficiency and durability against charging and discharging. The porous silicon-containing composite including both the first primary particle 21 and the second primary particle 22 may have an improved density of silicon particles and an improved sliding network, and lead to a reduced volume expansion. The first primary particle 21 may be connected to a surface of the second primary particle 22 via the second graphene 20b present in the form of flakes on the surface of the second primary particle 22, thus enhancing a conductive network. As a result, a lithium battery having improved rate characteristics may be manufactured using the porous silicon-containing composite according to any of the embodiments.

The number of layers of the second graphene 10b of the core 1 may be the same as or different from that of the first graphene 10a of the shell 2.

The first graphene 10a of the shell 2 may have a higher density than the second graphene 10b of the core 1. In one or more embodiments, the number of layers of the second graphene 10b in the core 1 may be in a range of one layer to about 30 layers, for example, about 5 layers to about 15 layers, and for example, about 10 layers. The number of layers of the first graphene 10a in the shell 2 may be in a range of one layer to about 50 layers, for example, about 20 layers to about 30 layers.

The porous silicon-containing composite according to an embodiment may further include an outermost layer having a higher density than the core 1. Although a thickness of the outermost layer is not specifically limited, the outermost layer may have a thickness of about 20 nm to about 60 nm.

The core 1 and the shell 2 may further include graphite.

A diameter ratio of the porous silicon composite secondary particle to the porous silicon-containing composite may be about 1:1 to about 1:30, for example, about 1:2 to about 1:30, and for example, about 1:1 to about 1:25, and for example, about 1:21. The diameter ratio of the porous silicon composite secondary particle to the porous silicon-containing composite may refer to a diameter ratio when the porous silicon composite secondary particle and the porous silicon-containing composite are both spherical, and may refer to a ratio of lengths of the major axes when the porous silicon composite secondary particle and the porous silicon-containing composite are both non-spherical.

In the porous silicon-containing composite according to an embodiment, the core may have a diameter of about 3 μm to about 10 μm, and the shell may have a thickness of about 10 nm to about 5,000 nm (about 0.01 μm to about 5 μm), for example, about 10 nm to about 1,000 nm. A ratio of the diameter of the core including the porous silicon composite secondary particles to the thickness of the shell may be about 1:0.001 to about 1:1.67, for example, about 1:001, about 1:1.67, about 1:0.0033, or about 1:0.5.

In the porous silicon-containing composite according to one or more embodiments, a total content of the first graphene and the second graphene may be about 0.1 parts to about 2,000 parts by weight, and in some embodiments, about 0.1 parts to about 300 parts by weight, and in some embodiments, about 0.1 parts to about 90 parts by weight, and in an embodiment, about 5 parts to about 30 parts by weight, each with respect to 100 parts by weight of the silicon. When the total content of the first graphene and the second graphene is within these ranges, volume expansion of the silicon may be effectively suppressed and improved conductivity characteristics may be obtained.

The second graphene in the silicon composite primary particles may at a distance of about 10 nm or less from surface of the silicon suboxide (SiO$_x$) (wherein 0<x<2) and may include at least one graphene layer, for example, about 1 to 30 graphene layers. A total thickness of the second graphene may be about 0.3 nm to about 50 nm, for example, about 0.6 nm to about 50 nm, and for example, about 1 nm to about 30 nm. The second graphene may be oriented at an angle of about 0° to about 90° with respect to a main axis of the silicon.

In the porous silicon-containing composite according to an embodiments, the first graphene may be at a distance of about 1,000 nm or less, and in some embodiments, about 500 nm or less, and in some embodiments, about 10 nm or less, and in an embodiment, about 1 nm or less, and in some other embodiments, about 0.00001 nm to about 1 nm, from the surface of the silicon suboxide ($SiO_x$) (wherein 0<x<2) in the porous silicon composite secondary particles. The first graphene may include at least one graphene layer, for example, about 1 to 30 graphene layers, and a total thickness of the first graphene may be about 0.6 nm to about 50 nm, for example, about 1 nm to about 50 nm. The first graphene may be oriented at an angle of about 0° to about 90° with respect to the major axis of the silicon.

The silicon suboxide ($SiO_x$) (wherein 0<x<2) on the first primary particle and the second primary particle may have a thickness of about 30 μm or less, for example, about 1 μm or less, for example, about 0.1 nm to about 10 nm.

The porous silicon composite secondary particles may have an average particle diameter (D50) of about 200 nm to about 50 μm, and in some embodiments, about 1 μm to about 30 μm, and in some embodiments, about 2 μm to about 25 μm, and in some embodiments, about 3 μm to about 20 μm, and in some other embodiments, about 1 μm to about 15 μm, and in still other embodiments, about 7 μm to about 11 μm. For example, the porous silicon composite secondary particles may have a D10 of about 0.001 μm to about 10 μm, and in some embodiments, about 0.005 μm to about 5 μm, and in some other embodiments, about 0.01 μm to about 1 μm. For example, the porous silicon composite secondary particles may have a D90 of about 10 μm to about 60 μm, and in some embodiments, about 12 μm to about 28 μm, and in some other embodiments, about 14 μm to about 26 μm.

As used herein, "average particle diameter" or "D50 particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be measured with a particle size analyzer or may be measured by using a transmission electron microscope (TEM) or a scanning electron microscope (SEM) image. As an example of other measuring methods, average particle size may be measured with a measurement device using dynamic light scattering, the number of particles within predetermined size ranges may be counted, and an average particle diameter may be calculated therefrom.

The porous silicon composite secondary particles may have a specific surface area of about 0.1 square meters per gram ($m^2/g$) to about 100 $m^2/g$, and in some embodiments, about 1 $m^2/g$ to about 30 $m^2/g$, and in some embodiments, about 1 $m^2/g$ to about 10 $m^2/g$, and in some other embodiments, about 1 $m^2/g$ to about 5 $m^2/g$. The porous silicon composite secondary particles may have a density of about 0.1 grams per cubic centimeter (g/cc) to about 2.8 g/cc, and in some embodiments, about 0.1 g/cc to about 2.57 g/cc, and in some other embodiments, about 0.5 g/cc to about 2 g/cc, and in some other embodiments, about 1.1 g/cc to about 1.2 g/cc, and in some other embodiments, about 1.18 g/cc.

The porous silicon-containing composite may further include a carbonaceous coating layer on at least one surface thereof. When the carbonaceous coating layer is further included, a lithium battery with improved lifespan characteristics, though it may have a reduced initial efficiency, may be manufactured using the porous silicon-containing composite. The carbonaceous coating layer may include amorphous carbon, which may facilitate migration of lithium during charging and discharging. The carbonaceous coating layer may entirely or partially cover the surface of the porous silicon-containing composite. For example, a coverage ratio of the carbonaceous coating layer with respect to a total surface area of the porous silicon-containing composite may be about 10% to about 99%, and in some embodiments, about 20% to about 95%, and in some other embodiments, about 40% to about 90%.

A ratio of the diameter of the porous silicon-containing composite to the thickness of the carbonaceous coating layer may be about 1:0.0001 to about 1:50, and in some embodiments, about 1:1 to about 1:40, and in some other embodiments, about 1:0.0001 to about 1:1. The carbonaceous coating layer may have a thickness of about 1 nm to about 5,000 nm, for example, about 10 nm to about 2,000 nm.

The carbonaceous coating layer may include a carbonaceous material. For example, the carbonaceous material may be graphene, amorphous carbon, carbon nanotubes, pitch carbon, fullerene, carbon fibers, or a combination thereof.

The carbonaceous coating layer may have a single-layered structure including amorphous carbon and crystalline carbon. The carbonaceous coating layer may have a double-layered structure having first and second carbonaceous coating layers including amorphous carbon and crystalline carbon, respectively.

For example, the carbonaceous coating layer may have a structure in which the first carbonaceous coating layer including amorphous carbon and the second carbonaceous coating layer including crystalline carbon are sequentially stacked on the porous silicon-containing composite in the stated order, or a structure in which the second carbonaceous coating layer including crystalline carbon and the first carbonaceous coating layer including amorphous carbon are sequentially stacked on the porous silicon-containing composite in the stated order.

The porous silicon-containing composite according to an embodiment may have a narrow particle size distribution. For example, the porous silicon-containing composite may have a D50 of about 1 μm to about 30 μm, a D10 of about 0.001 μm to about 10 μm, and a D90 of about 10 μm to about 60 μm. The porous silicon-containing composite may be formed as secondary particles.

The porous silicon-containing composite according to an embodiment may have a narrow particle size distribution within the above-described ranges. Unlike the porous silicon-containing composite according to an embodiment, common silicon composite secondary particles obtained from silicon composite primary particles may have an irregular secondary particle size distribution, and thus it may be difficult to control a particle size of a negative active material to improve the cell performance.

In the porous silicon-containing composite according to one or more embodiments, an oxygen content may be about 0.01 atomic % to about 15 atomic %, and in some embodiments, about 3.5 atomic % to about 5 atomic %, and in some other embodiments, about 3.5 atomic % to about 3.8 atomic %, each based on a total content of oxygen, carbon, and silicon atoms in the porous silicon-containing composite. The oxygen content of the porous silicon-containing composite according to an embodiments is smaller than that of a common silicon-based material, which is due to inhibited oxidation of the silicon with use of a dispersing agent such as stearic acid in preparing the porous silicon-containing composite. This reduced oxygen content may lead to increased silicon capacity and improved initial efficiency.

The porous silicon-containing composite having a double core/shell structure may form a uniform charge and discharge network, thus preventing cracking caused due to volume expansion and shrinkage of silicon and leading to formation of a stable solid electrolyte interphase (SEI) layer on a surface thereof during charging and discharging. Accordingly, a negative electrode having improved durability against charging and discharging may be manufactured using the porous silicon-containing composite according to an embodiment.

The operation principle of a negative electrode using the porous silicon-containing composite according to any one of the embodiments as a negative active material will now be described.

A negative active material layer including the porous silicon-containing composite may be on a copper current collector for the negative electrode. The porous silicon-containing composite may have a small Brunauer-Emmett-Teller (BET) specific surface area, and thus inhibit permeation of electrolyte and have a reduced area for a side reaction with the electrolyte to effectively suppress the side reaction with the electrolyte and inhibit delithiation of the active material and expansion of the electrode. As a result, a lithium battery using negative electrode including the porous silicon-containing composite according to any of the embodiments may have improved initial efficiency and durability during charging and discharging. In the porous silicon-containing composite according to an embodiment, the first silicon as the first primary particle and the second silicon as the second primary particle may be connected to each other through graphene, and a sliding network may be well formed, thus resulting in an improved volume expansion suppression effect.

Graphene may suppress crushing or pulverization of particles which occurs with common silicon particles. A graphene sliding layer may serve as a clamping layer preventing disintegration of the silicon particles, and may also allow for an alloying reaction of lithium ions with silicon (Si) to provide a significant specific capacity and a continuous conduction path between the particles.

The graphene layers may slide over one another while silicon particles swell, and then slid back to their relaxed positions during delithiation. This movement is because the van der Waals force is greater than the friction between the layers.

The camping effect of the graphene layers may be verified from the fact that the graphene layers remain as they are and still serve as a clamping layer preventing disintegration of the silicon particles after repeated lithiation/delithiation cycles.

The porous silicon-containing composite according to an embodiment may have excellent capacity characteristics with a capacity of about 600 milliampere hour per cubic centimeter (mAh/cc) to about 2,000 mAh/cc.

In the porous silicon-containing composite according to an embodiment, the second graphene may entirely or partially cover the surface of the first primary particle or the second primary particle. When the silicon suboxide is on the first primary particle and the second primary particle, the second graphene may entirely or partially cover a surface of the silicon suboxide. For example, a coverage ratio of the second graphene with respect to a surface area of the first primary particle, the second primary particle, or the silicon suboxide may be about 10% to about 99%, and in some embodiments, about 20% to about 95%, and in some other embodiments, about 40% to about 90%.

In the porous silicon-containing composite according to an embodiment, the first graphene may entirely or partially cover a surface of the porous silicon composite secondary particles. For example, a coverage ratio of the first graphene with respect to a surface area of the porous silicon composite secondary particles may be about 10% to about 99%, and in some embodiments, about 20% to about 95%, and in some embodiments, about 40% to about 90%.

The porous silicon-containing composite may have a non-spherical shape. For example, the porous silicon-containing composite may have a circularity of about 0.9 or less, and in some embodiments, about 0.7 to about 0.9, and in some other embodiments, about 0.85 to about 0.9.

The circularity may be determined according to Equation 1, wherein A is the area, and P is the perimeter.

$$\text{circularity} = \frac{4\pi A}{P^2} \quad \text{Equation 1}$$

The first graphene and the second graphene may be any carbonaceous materials having a flake shape. Examples of the carbonaceous materials may be graphene, graphite, carbon fiber, graphitic carbon, or graphene oxide.

The first graphene and the second graphene may have a structure, for example, a nanosheet, a layer (or a film), a graphene nanosheet, a flake, or the like. As used herein, the term "nanosheet" may refer to a structure in an irregular form on the first primary particle, the second primary particle or the silicon suboxide, and the term "layer" may refer to a continuous, uniform film formed on the first primary particle, the second primary particle, or the silicon suboxide.

The amorphous carbon of the carbonaceous coating layer may comprise pitch carbon, soft carbon, hard carbon, mesophase pitch carbonization products, sintered cokes, carbon fiber, or a combination thereof. The carbonaceous coating layer may be a non-porous, continuous coating layer. For example, the carbonaceous coating layer may have a thickness of about 1 nm to about 5000 nm.

The carbonaceous coating layer may further include crystalline carbon. When the carbonaceous coating layer further includes crystalline carbon, the carbonaceous coating layer may perform facilitated buffering against volume expansion of the porous silicon-containing composite.

The crystalline carbon may be natural graphite, artificial graphite, graphene, fullerene, carbon nanotubes, or a combination thereof.

In the porous silicon-containing composite according to an embodiment, a mixed ratio of total carbon (first carbon) of the first graphene and the second graphene to carbon (second carbon) of the carbonaceous coating layer may be about 30:1 to about 1:3 by weight, for example, about 20:1 to about 1:1 by weight, and for example, about 10:1 to about 1:0.9 by weight. The term "first carbon" may refer to the carbon sum of the first graphene and the second graphene. When the mixed ratio of the first carbon to the second carbon is within these ranges, a lithium battery with improved discharge capacity and improved capacity retention may be manufactured using the porous silicon-containing composite.

The mixed ratio of the first carbon to the second carbon may be identified by thermogravimetric analysis (TGA). The first carbon is associated with peaks appearing at about 700° C. to 750° C., and the second carbon is associated with peaks appearing at about 600° C. to 650° C.

The TGA may be performed, for example, at a temperature of 25° C. to about 1,000° C. under atmospheric conditions at a temperature increase rate of about 10° C./min.

The first carbon may be crystalline carbon, and the second carbon may be amorphous carbon.

A mixed ratio of a total weight of the first graphene and the second graphene to a total weight of the first carbon and second carbon may be about 1:1.03 to about 1:10, for example, about 1:1.03 to about 1:4. In the porous silicon-containing composite according to an embodiment, the porous silicon composite secondary particle may have a size of about 3 μm to about 10 μm, and the first graphene and the second graphene may have a size of about 10 nm to about 100 nm, respectively. As used herein, the term "size" may refer to a diameter or a length of the major axis. When the first graphene and the second graphene have a spherical shape, the term "size" means diameter. In the case where the first graphene and the second graphene have an non-spherical shape, the term "size" means a major axis length.

In the porous silicon-containing composite according to an embodiment, the porous silicon composite secondary particle may have a diameter of about 3 μm to about 10 μm, and the shell may have a thickness of about 10 nm to about 5,000 nm (about 0.01 μm to about 5 μm), for example, about 10 nm to about 1,000 nm. A ratio of the diameter of the core including the porous silicon composite secondary particle to the thickness of the carbonaceous coating layer may be about 1:0.001 to about 1:1.67, and in some embodiments, about 1:001, about 1:1.67, about 1:0.0033, or about 1:0.5.

In the porous silicon-containing composite according to an embodiment, a total amount of the first graphene and the second graphene may be about 0.1 parts to about 2,000 parts by weight, for example, about 0.1 parts to about 1,000 parts by weight, for example, about 0.1 parts to about 500 parts by weight, for example, about 0.1 parts to about 300 parts by weight, for example, about 0.1 parts to about 90 parts by weight, and for example, about 5 parts to about 30 parts by weight, with respect to 100 parts by weight of the silicon. Here, the term "silicon" includes both the first primary particle and the second primary particle. When the amount of the first and second graphene is within these ranges, the first primary particle and the second primary particle may have an improved volume expansion suppression effect and improved conductivity characteristics.

The first graphene and the second graphene may be, for example, graphene flakes.

In the porous silicon-containing composite, the first graphene may be graphene flakes, and the first graphene may be at a distance from the silicon suboxide (SiO$_x$) (wherein 0<x<2) of about 1,000 nm or less, for example, a distance of about 500 nm or less, for example, a distance of about 100 nm or less, for example, a distance of about 50 nm or less, for example, a distance of about 10 nm or less, for example, about 1 nm or less, and for example, about 0.00001 nm to about 1 nm. The first graphene may include at least one graphene layer, for example, about 1 to 30 graphene layers. A total thickness of the first graphene may be about 0.6 nm to about 50 nm, for example, about 1 nm to about 50 nm. The first graphene may be oriented at an angle of about 0° to about 90°, for example, about 10° to about 80°, and for example, about 20° to about 70°, each with respect to the major axis (for example, Y-axis) of the silicon.

The second graphene of the silicon composite primary particles may be graphene flakes, and the graphene flakes may at a distance of about 10 nm or less, for example, about 5 nm or less, for example, about 3 nm or less, and for example, about 1 nm or less, from the silicon suboxide (SiO$_x$) (wherein 0<x<2) by. The second graphene may include a graphene layer. For example, a total thickness of the second graphene may be about 1,000 nm or less, for example, about 0.3 nm to about 1,000 nm, for example, about 0.3 nm to about 50 nm, for example, about 0.6 nm to about 50 nm, and for example, about 1 nm to about 30 nm. In the porous silicon-containing composite according to an embodiment, the second graphene may be oriented at an angle of about 0° to about 90°, for example, about 10° to about 80°, and for example, about 20° to about 70°, each with respect to the major axis (for example, Y-axis) of the silicon. As used herein, the term "major axis" may refer to the Y-axis.

For example, a thickness of the silicon suboxide (SiO$_x$) (wherein 0<x<2) may be about 30 μm or less, for example, about 10 μm or less, for example, about 1 nm to about 100 nm, for example, about 1 nm to about 50 nm, and for example, about 10 nm. The silicon suboxide may entirely or partially cover a surface of the silicon. For example, a coverage ratio of the silicon suboxide may be about 10% to about 99%, for example, about 20% to about 95%, for example, about 30% to about 93%, and for example, about 40% to about 90%, each based on the surface area of the silicon.

Hereinafter, a method of preparing the porous silicon-containing composite according to an embodiment will be described. First, a structure including silicon and silicon suboxide (SiO$_x$, wherein 0<x<2) on the silicon may be pulverized to obtain pulverized first primary particle such as the first silicon as primary particles. The pulverized first primary particle may be mixed with second primary particle such as the second silicon, a dispersing agent and a solvent to obtain a composition. Next, porous silicon composite secondary particles may be obtained from the composition. The porous silicon composite secondary particles may have a porosity of, for example, about 0.1% to about 50%, for example, about 1% to about 40%, and for example, about 5% to about 30%, and may have a pore size of about 10 nm to about 500 nm, for example, about 20 nm to about 200 nm, and for example, about 30 nm to about 300 nm.

The preparation of the porous silicon composite secondary particles from the composition may be performed using any of a variety of methods, for example, co-precipitation, spray drying, or a solid phase method. For example, the porous silicon composite secondary particles may be prepared by using spray drying. When the porous silicon composite secondary particles are prepared by spray drying, a particle diameter thereof may be controlled by appropriately choosing a spraying type, a pressurized gas supply rate, a composition supply rate, a drying temperature, and the like.

The spray drying may be performed at an atmospheric temperature of about room temperature (25° C.) to about 500° C., for example, about 50° C. to about 300° C., and in some embodiments, about 50° C. to about 250° C., and in some other embodiments, about 70° C. to about 200° C. When the spray drying is performed within these temperature ranges, particle agglomeration and blocking of a particle discharge outlet due to moisture condensation near the particle discharge outlet may be prevented, and the porous silicon composite secondary particles may have an appropriate porosity.

In the spray drying, a spraying pressure may be about 1 bar to about 5 bar.

Prior to the spray drying, a surface area of a starting material may be increased as large as possible, for example, by pulverization. To this end, pulverized silicon primary particles may be used as a starting material.

For example, when the porous silicon composite secondary particles are formed using spray drying, the obtained porous silicon composite secondary particles may be spherical. The dispersing agent, for example, stearic acid, may partially remain on a surface of the porous silicon composite secondary particles.

Next, while a carbon source gas is supplied, the porous silicon composite secondary particles may be thermally treated, so that graphene may be distributed on the porous silicon composite secondary particles, thereby preparing a porous silicon-containing composite.

A carbonaceous coating layer may then be formed on the porous silicon-containing composite, to thereby obtain a porous silicon-containing composite comprising the carbonaceous coating layer.

After the pores in the porous silicon composite secondary particles are filled with the carbon source gas, graphene may grow on external surfaces of the porous silicon composite secondary particles.

The solvent may be an alcoholic solvent. The alcoholic solvent may be, for example, ethanol, methanol, or isopropyl alcohol. When these alcoholic solvents are used and heat treatment is performed, the dispersing agent may be used together with the solvent, so that an amount the dispersing agent remaining in the porous silicon-containing composite may be reduced. As a result, a porous silicon-containing composite with a reduced amount of oxygen may be obtained.

The dispersing agent may uniformly disperse the silicon primary particles. Non-limiting examples of the dispersing agent may be stearic acid, resorcinol, polyvinyl alcohol, carbon pitch, or a combination thereof. The amount of the dispersing agent may be about 1 part to about 15 parts by weight, for example, about 5 parts to about 10 parts by weight, based on 100 parts of a total weight of the composition. When the amount of the dispersing agent is within these ranges, silicon and graphene may be uniformly dispersed without agglomerating.

The carbon source gas may be a compound represented by Formula 1, a compound represented by Formula 2, and a first oxygen-containing compound represented by Formula 3.

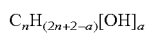   Formula 1

In Formula 1, n may be an integer of 1 to 20, for example, an integer of 2 to 18, or an integer of 4 to 16, and a may be 0 or 1.

   Formula 2

In Formula 2, n may be an integer of 2 to 6.

   Formula 3

In Formula 3, x may be an integer of 1 to 20, for example, an integer of 2 to 18, or an integer of 4 to 16; y may be 0 or an integer of 1 to 20, or an integer of 2 to 18; and z may be 1 or 2.

The carbon source gas may be, for example, methane, ethylene, propylene, methanol, ethanol, propanol, acetylene, or a combination thereof.

The thermal treatment may be performed at a temperature of about 750° C. to about 1,100° C., and for example, at a temperature of about 700° C. to about 1,000° C. When the thermal treatment is performed within these temperature ranges, graphenes may be generated in the core and/or the shell both at a high density.

When the graphene is carbon nanotube flakes, carbon fiber flakes, graphitic carbon flakes, or graphene oxide flakes, the graphene may be prepared using a common method known in the art.

The method may further include dry-mixing a composition including the prepared porous silicon-containing composite according to an embodiment, a carbonaceous material, and a solvent to obtain a porous-silicon-containing composite including a carbonaceous coating layer. For example, an amount of the carbonaceous material may be about 0.001 parts by weight to about 99 parts by weight with respect to 100 parts by weight of a total weight of the porous silicon-containing composite and the carbonaceous material.

When the silicon composite primary particles include silicon suboxide ($SiO_x$) (wherein $0<x<2$) on the first primary particle such as the first silicon and the second primary particle such as the second silicon, the silicon suboxide, as an unstable oxygen-deficient material as compared with silicon oxide ($SiO_2$), may tend to form a stable material through reaction with another reactive material such as a carbon source gas. Based on this tendency, the silicon suboxide ($SiO_x$) (wherein $0<x<2$) may be used as a seed layer for forming graphene.

A thickness of the silicon suboxide ($SiO_x$) (wherein $0<x<2$) on the silicon may significantly affect a shape and/or structure of the graphene.

The thickness of the silicon suboxide ($SiO_x$) (wherein $0<x<2$) may be varied by controlling a process involved in graphene formation, for example, by controlling a composition of the carbon source gas used for forming graphene. The silicon suboxide ($SiO_x$) (wherein $0<x<2$) may have a thickness of about 300 μm or less.

The silicon suboxide ($SiO_x$, wherein $0<x<2$) may have a thickness of about 10 nm or less, and in some embodiments, about 0.1 nm to about 10 nm, and in some other embodiments, about 0.1 nm to about 5 nm. When the thickness of the silicon suboxide is within these ranges, a lithium battery having improved capacity characteristics may be manufactured using the porous silicon-containing composite including the silicon composite primary particles including the silicon suboxide ($SiO_x$, wherein $0<x<2$).

In an embodiment, by using non-catalytic vapor carbon deposition, the graphene may be formed on the silicon suboxide ($SiO_x$, wherein $0<x<2$) on the silicon.

According to the vapor carbon deposition, graphene may directly grow on the silicon covered with silicon suboxide ($SiO_x$), and thus the silicon and the graphene may have strong adhesion to each other.

In some embodiments, even when the silicon suboxide ($SiO_x$) is not present on the silicon, through a reaction process of a carbon-containing mixed gas with an oxygen-containing mixed gas, a silicon suboxide ($SiO_x$) layer may be formed first on the silicon due to the reaction of the oxygen-containing mixed gas, and then graphene may be formed thereon due to the reaction of the carbon-containing mixed gas.

A degree of adhesion between the first primary particle or second primary particle and the second graphene may be evaluated by measuring a distance between the silicon suboxide ($SiO_x$) and the second graphene by scanning electron microscopy (SEM). The second graphene may be at a distance of about 10 nm or less from the silicon suboxide. In some embodiments, the second graphene may be spaced from the silicon suboxide by a distance of about 1 nm or less, for example, about 0.005 nm to about 1 nm. The second graphene may be oriented at an angle of about 0° to about 90°, and in some embodiments, about 10° to about 80°, and in some other embodiments, about 20° to about 70°, with respect to a major axis of the silicon. The second graphene may include at least 1 to 30 graphene layers, and in some embodiments, about 2 to 25 graphene layers, and in some other embodiments, about 4 to 20 graphene layers, and may have a total thickness of about 0.6 nm to about 12 nm, and in some embodiments, about 1 nm to about 10 nm, and in some other embodiments, about 2 nm to about 8 nm. The second graphene may be oriented at an angle of 0° to about 90° with respect to the major axis of the silicon. As used here, the major axis may refer to Y-axis.

The porous silicon-containing composite may further include a metal oxide or a metal fluoride. When the porous silicon-containing composite according to any of the embodiments further includes a metal oxide, formation of a solid electrolyte interphase (SEI) layer may be prevented due to suppression of a side reaction.

The metal oxide may include a magnesium oxide, a manganese oxide, an aluminum oxide, a titanium oxide, a zirconium oxide, a tantalum oxide, a tin oxide, a hafnium oxide, or a combination thereof. The metal fluoride may include an aluminum fluoride ($AlF_3$).

According to another aspect, a carbon composite includes the porous silicon-containing composite according to any of the above-described embodiments, and a carbonaceous material.

An amount of the porous silicon-containing composite in the carbon composite may be about 0.001 parts to about 99.999 parts by weight, for example, about 1 part to about 95 parts by weight, for example, about 3 parts to about 85 parts by weight, for example, about 5 parts to about 70 parts by weight, and for example, about 5 parts to about 50 parts by weight, each with respect to 100 parts by weight of a total weight of the carbon composite.

The carbon composite may have further improved initial efficiency, specific capacity characteristics, rate capability and durability, as compared with those of the porous silicon-containing composite.

The carbonaceous material may be, for example, graphene, graphite, fullerene, carbon fiber, carbon nanotubes, or a combination thereof. For example, an amount of the carbonaceous material may be about 0.001 parts to about 99.999 parts by weight with respect to 100 parts by weight of the carbon composite. For example, the amount of the carbonaceous material may be about 10 parts to about 97 parts by weight, for example, about 50 parts to about 97 parts by weight, each with respect to 100 parts by weight of the carbon composite. When the amount of the carbonaceous material in the carbon composite is within these ranges, the carbon composite may have improved capacity and conductivity.

The carbon composite may include, for example, graphite, and the porous silicon-containing composite on the graphite.

The graphite may be, for example, SFG6 graphite, and may have an average particle diameter of about 6 μm. When an electrode is formed using the carbon composite, an amount of the carbon composite in the electrode may be, for example, about 0.001 parts to about 99.999 parts by weight, for example, about 1 part to about 95 parts by weight, for example, about 50 parts to about 90 parts by weight, and for example, about 68 parts to about 87 parts by weight, each with respect to 100 parts by weight of a total weight of the electrode, and an amount of a binder may be, for example, from about 13 parts to about 32 parts by weight. For example, an amount of the graphite in the carbon composite may be, for example, 1 part to about 99 parts by weight with respect to 100 parts by weight of a total weight of the carbon composite.

The binder may be, for example, a lithium-substituted polyacrylate.

The compound represented by Formula 1 and the compound represented by Formula 2 may each independently be methane, ethylene, propylene, methanol, ethanol, propanol, or a combination thereof.

The first oxygen-containing compound represented by Formula 3 may include, for example, carbon dioxide ($CO_2$), carbon monoxide (CO), water vapor ($H_2O$), or a mixture thereof.

In addition to the carbon source gas, an inert gas such as nitrogen, helium, argon, or a combination thereof may be further used.

The first oxygen-containing compound may be carbon monoxide, carbon dioxide, water vapor, or a combination thereof.

When the first oxygen-containing compound is used as the carbon source gas, the silicon suboxide may be formed to have a larger thickness than a thickness of a natural silicon oxide layer. For example, the thickness of the silicon suboxide may be controlled to be about 10 nm or less, for example, about 0.5 nm to about 5 nm. By using the silicon suboxide having a thickness within these ranges, a shape and thickness of the graphene may be controlled. In particular, when the silicon suboxide is formed to have a larger thickness than a natural oxide layer, the graphene thereon may have a denser structure than a graphene nanosheet. The graphene may have a structure including, for example, about 5 to 10 layers.

When the carbon source gas includes water vapor, the porous silicon-containing composite obtained therefrom may have further increased conductivity. While not being limited to this theory, it is understood that, since carbon having a high degree of crystallinity may be deposited on the silicon coated with the silicon suboxide by reaction with the carbon source gas in the presence of water vapor, the porous silicon-containing composite may have high conductivity even when coated with a small amount of carbon. The amount of water vapor in the carbon source gas, though not specifically limited, may be, for example, in a range of about 0.01% by volume to about 10% by volume based on 100% by volume of the carbon source gas.

The carbon source gas may be, for example, methane; a mixed gas of methane and an inert gas; an oxygen-containing compound; or a mixed gas of methane and an oxygen-containing compound. In some embodiments, the carbon source gas may be a mixed gas of $CH_4$ and $CO_2$, or a mixed gas of $CH_4$, $CO_2$, and $H_2O$.

The mixed gas of $CH_4$ and $CO_2$ may be supplied in a molar ratio of about 1:0.20 to about 1:0.50, and in some embodiments, in a molar ratio of about 1:0.25 to about 1:0.45, and in some other embodiments, in a molar ratio of about 1:0.30 to about 1:0.40.

The mixed gas of $CH_4$, $CO_2$ and $H_2O$ may be supplied in a molar ratio of about 1:0.20 to 0.50:0.01 to 1.45, and in some embodiments, in a molar ratio of about 1:0.25 to 0.45:0.10 to 1.35, and in some other embodiments, in a molar ratio of about 1:0.30 to 0.40:0.50 to 1.0.

The carbon source gas may be carbon monoxide (CO) or carbon dioxide ($CO_2$). In some other embodiments, the carbon source gas may be a mixed gas of $CH_4$ and $N_2$.

The mixed gas of $CH_4$ and $N_2$ may be supplied in a molar ratio of about 1:0.20 to about 1:0.50, and in some embodiments, in a molar ratio of about 1:0.25 to 1:0.45, and in some other embodiments, in a molar ratio of about 1:0.30 to about 1:0.40. In some embodiments, the carbon source gas may not include an inert gas such as nitrogen.

The thermal treatment may be performed at a temperature of about 750° C. to about 1100° C., and in some embodiments, about 800° C. to about 1000° C.

The thermal treatment may be performed at any pressure level without limitation. The pressure level for the thermal treatment may be appropriately selected in consideration of a thermal treatment temperature, composition of the gas mixture, and a target amount of coated carbon. The pressure level for the thermal treatment may be controlled by varying amounts of inflow and outflow of the gas mixture. For example, the pressure for the thermal treatment may be about 1 atmosphere (atm) or greater, and in some embodiments, about 2 atm or greater, about 3 atm or greater, about 4 atm or greater, or about 5 atm or greater. However, embodiments are not limited thereto.

The thermal treatment time may not be specifically limited, and may be appropriately controlled depending on the thermal treatment temperature, thermal treatment pressure, composition of the gas mixture, and target amount of coated carbon. For example, the thermal treatment time may be in a range of about 10 minutes to about 100 hours, and in some embodiments, may be in a range of about 30 minutes to about 90 hours, and in some other embodiments, may be in a range of about 50 minutes to about 40 hours. However, embodiments are not limited thereto. While not limited to this theory, it is understood that the longer the thermal treatment time, the greater the amount of graphene (carbon) that may be deposited, and the better the electrical characteristics of the composite may become. However, these effects may not be directly proportional to the thermal treatment time. For example, deposition of graphene may stop or a deposition rate thereof may become low after a predetermined duration.

The method of preparing the porous silicon-containing composite structure may provide a uniform coating on graphene on the silicon covered with the silicon suboxide ($SiO_x$) even at a relatively low temperature, through a vapor phase reaction of the carbon source gas as described above. Separation of the graphene from the silicon covered with the silicon suboxide ($SiO_x$) may substantially not occur. When a thickness of the silicon suboxide is appropriately controlled, the separation of the graphene may be even further suppressed. In this regard, a thickness of the silicon suboxide that may efficiently suppress separation of the graphene may be about 10 nm or less, for example, from about 0.1 nm to about 10 nm, for example, from about 0.1 nm to about 5 nm.

Due to the coating of graphene on the silicon through a vapor phase reaction, a coating layer having a high degree of crystallinity may be formed. When the porous silicon-containing composite is used as a negative active material, the negative active material may have improved conductivity without a structural change.

A process of preparing a carbon composite using the porous silicon-containing composite may be as follows.

The porous silicon-containing composite according to any of the embodiments and a carbonaceous material may be mixed together and then thermally treated. The thermal treatment may be performed at a temperature of about 750° C. to about 1100° C., for example, about 700° C. to about 1,000° C. When the thermal treatment temperature is within these ranges, a carbon composite having improved capacity characteristics may be obtained.

According to another aspect, an electrochemical active material composite includes: an electrochemical active material; and the porous silicon-containing composite according to any of the above-described embodiments, a carbon composite including the porous silicon-containing composite and a carbonaceous material, or a combination thereof, wherein the porous silicon-containing composite, the carbon composite, or a combination thereof is coated on a surface of the electrochemical active material.

The electrochemical active material may be any positive active material or negative active material which is commonly available in batteries.

The porous silicon-containing composite or the carbon composite according to any of the embodiments may be used in, for example, a battery, a field emission material for a display, a thermoelectric device, or a biosensor.

According to another aspect, an electrode includes the porous silicon-containing composite or the carbon composite according to any of the above-described embodiments. The electrode may be an electrode for a lithium battery.

The electrode may be, for example, a negative electrode.

The porous silicon-containing composite or the carbon composite according to any of the embodiments may be used as an electrode active material, for example, a negative active material. When the porous silicon-containing composite or the carbon composite is used as a negative active material, volume expansion and disintegration of silicon may be reduced or prevented. The negative active material may have improved conductivity, and may improve high-rate characteristics of a battery. Moreover, since a small amount of graphene may be coated on the silicon covered with the silicon suboxide, the negative active material may have improved energy density per volume.

According to another aspect, a lithium battery includes an electrode including the porous silicon-containing composite according to any of the embodiments, or a carbon composite including the porous silicon-containing composite according to any of the embodiments and a carbonaceous material.

The negative electrode may be manufactured in the following manner.

The negative electrode may be formed by molding, into a predetermined shape, a negative active material composition including, for example, the porous silicon-containing composite or the carbon composite according to any of the embodiments as a negative active material, a conducting agent, and a binder, or by coating the negative active material composition on a current collector, such as copper (Cu) foil. The negative active material composition may not include a conducting agent.

In some embodiments, the negative active material composition may be formed as a film on a separator without the current collector.

For example, the negative active material composition may be prepared by mixing the negative active material, a conducting agent, a binder, and a solvent. The negative active material composition may be directly coated on a metal current collector to form a negative electrode plate. In some other embodiments, the negative active material composition may be cast onto a separate support to form a negative active material film. The negative active material film may be separated from the support and then laminated on a metal current collector to thereby form a negative electrode plate. The negative electrode may have any of a variety of forms, not limited to the above-listed forms.

The negative active material composition may further include a carbonaceous negative active material, in addition to the above-described negative active material. For example, the carbonaceous negative active material may be natural graphite, artificial graphite, expanded graphite, graphene, carbon black, fullerene soot, carbon nanotubes, graphitic carbon, carbon fibers, or a combination. However, embodiments are not limited thereto. Any suitable carbonaceous negative active material available in the art may be used.

The conducting agent may be acetylene black, Ketjen black, natural graphite, artificial graphite, carbon black, carbon fibers, or a metal powder or metal fibers of copper, nickel, aluminum or silver. The conducting agent may include one or more conductive materials, such as a polyphenylene derivative in combination. However, embodiments are not limited thereto. Any suitable conducting agent available in the art may be used.

The binder may be a vinylidene fluoride/hexafluoropropylene copolymer, polyvinylidenefluoride (PVDF), polyacrylonitrile, polymethylmethacrylate, polytetrafluoroethylene, or mixtures thereof, a styrene-butadiene rubber-based polymer, polyacrylic acid, polyamide imide, or polyimide. However, embodiments are not limited thereto. Any suitable binder available in the art may be used.

The solvent may be N-methylpyrrolidone, acetone, or water. However, embodiments are not limited thereto. Any suitable solvent available in the art may be used.

The amounts of the negative active material, the conducting agent, the binder, and the solvent may be the same levels as commonly used in lithium batteries. At least one of the conducting agent, the binder, and the solvent may be omitted, depending on a use and a structure of a lithium battery.

The lithium battery may include the above-described negative electrode. The lithium battery may be manufactured in the following manner.

First, the negative electrode may be manufactured according to the above-described method.

Next, a positive active material composition may be prepared by mixing a positive active material, a conducting agent, a binder, and a solvent. The positive active material composition may be directly coated on a metal current collector and dried to manufacture a positive electrode plate. In some other embodiments, the positive active material composition may be cast on a separate support to form a positive active material film. The positive active material film may then be separated from the support and then laminated on a metal current collector, to thereby manufacture a positive electrode plate.

The positive active material may include lithium cobalt oxide, lithium nickel cobalt manganese oxide, lithium nickel cobalt aluminum oxide, lithium iron phosphate, lithium manganese oxide, or a combination thereof. However, embodiments are not limited thereto. Any positive active material available in the art may be used.

For example, the positive active material may be a lithium-containing metal oxide. Any suitable positive active material commonly used in the art may be used. For example, the positive active material may be a composite lithium oxide with at least one of cobalt (Co), manganese (Mn), and nickel (Ni), or a combination thereof. For example, the positive active material may be a compound represented by one of the following formulae: $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.5$, $0 \leq c \leq 0.05$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as positive active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element such as an oxide, a hydroxide, an oxyhydroxide, an oxycarbonate, a hydroxycarbonate, or a combination thereof. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed by any method that does not adversely affect physical properties of the positive active material when a compound is used as the coating element, for example, by a spray coating method, a dipping method, or the like. This will be understood by those of skill in the art, and thus a detailed description thereof will be omitted.

For example, the positive active material may be $LiNiO_2$, $LiCoO_2$, $LiMn_xO_{2x}$ (wherein $x=1$ or 2), $LiNi_{1-x}Mn_xO_2$ (wherein $0 < x < 1$), $LiNi_{1-x-y}Co_xMn_yO_2$ (wherein $0 x \leq x \leq 0.5$ and $0 \leq y \leq 0.5$), $LiFeO_2$, $V_2O_5$, TiS, or MoS.

The conducting agent, the binder, and the solvent used in the positive active material composition may be the same as those used in the negative active material composition described above. In some embodiments, a plasticizer may further be added to the positive active material composition and/or the negative active material composition to obtain an electrode including pores.

The amounts of the positive active material, the conducting agent, the binder, and the solvent may be the same levels as commonly used in lithium batteries. At least one of the conducting agent, the binder, and the solvent may be omitted depending on the use and structure of a lithium battery.

Next, a separator to be disposed between the positive electrode and the negative electrode may be prepared. The separator may be any separator commonly used in lithium batteries. In some embodiments, the separator may have low resistance to migration of ions in an electrolyte and have a good electrolyte-retaining ability. For example, the separator may be glass fiber, polyester, Teflon, polyethylene, polypropylene, polytetrafluoroethylene (PTFE), or combinations thereof, each of which may be a non-woven or woven fabric. For example, a rollable separator including polyethylene or polypropylene may be used in a lithium ion battery. A separator with a good organic electrolytic solution-retaining ability may be used in a lithium ion polymer battery. For example, the separator may be manufactured in the following manner.

In some embodiments, a polymer resin, a filler, and a solvent may be mixed together to prepare a separator composition. Then, the separator composition may be directly coated on a support and then dried to thereby form the separator. In some other embodiments, the separator composition may be cast on a support and dried to form a separator film. The separator film may be separated from the support and laminated on an electrode to thereby form the separator.

The polymer resin used in manufacturing the separator may be any material commonly used as a binder for electrode plates. For example, the polymer resin may be a vinylidene fluoride/hexafluoropropylene copolymer, PVDF, polyacrylonitrile, polymethylmethacrylate, or mixtures thereof.

The separator may include a ceramic component to improve its performance as a membrane. For example, the separator may be coated with an oxide or may be formed to include ceramic particles.

Next, an electrolyte may be prepared.

For example, the electrolyte may be an organic electrolyte solution. The electrolyte may be solid. For example, the electrolyte may be a boron oxide or a lithium oxynitride. However, embodiments are not limited thereto. Any suitable solid electrolyte available in the art may be used. The solid electrolyte may be formed on the negative electrode by a method, for example, by sputtering.

For example, an organic electrolyte solution may be prepared. The organic electrolyte solution may be prepared by dissolving a lithium salt in an organic solvent.

The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or mixtures thereof.

The lithium salt may be any lithium salt available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may be natural numbers), LiCl, LiI, or a mixture thereof.

Figure 8:
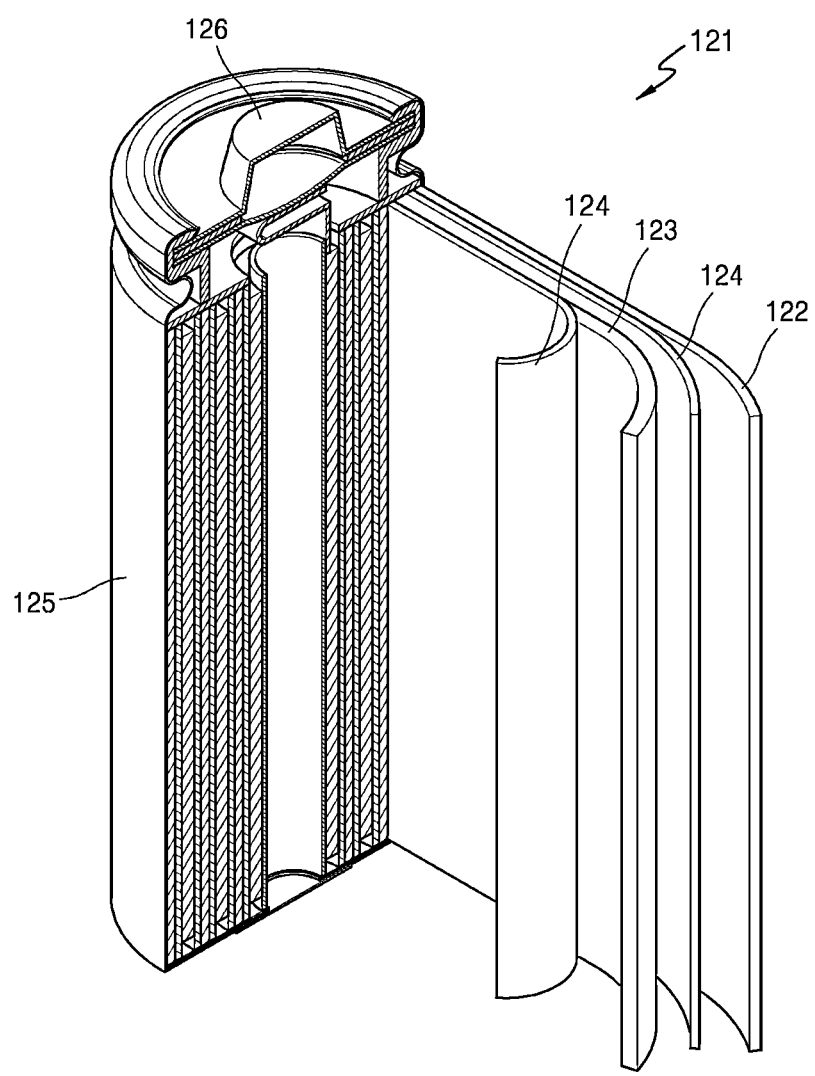
FIG. 8 is a schematic view of an embodiment of a lithium battery.

Referring to FIG. 8, a lithium battery 121 according to an embodiment may include a positive electrode 123, a negative electrode 122, and a separator 124. The positive electrode 123, the negative electrode 122, and the separator 124 may be wound or folded, and then sealed in a battery case 125. Then, the battery case 125 may be filled with an organic liquid electrolyte and sealed with a cap assembly 126, thereby completing the manufacture of the lithium battery 121. The battery case 125 may be a cylindrical type, a rectangular type, or a thin-film type. For example, the lithium battery 121 may be a thin-film type battery. For example, the lithium battery 121 may be a lithium ion battery.

The separator 124 may be interposed between the positive electrode 123 and the negative electrode 122 to form a battery assembly. A plurality of such battery assemblies may be stacked in a bi-cell structure and impregnated with an organic electrolyte solution. The resultant battery assembly may then be put into a pouch and hermetically sealed to thereby complete the manufacture of a lithium ion battery.

In some embodiments, a plurality of battery assemblies may be stacked upon one another to form a battery pack, which may be used in any device that requires high capacity and high output, for example, in a laptop computer, a smartphone, an electric vehicle, and the like.

When the number of charge-discharge cycles of the lithium battery is 100 times or less, the porous silicon-containing composite according to any of the embodiments may include first primary particle and second primary particle, wherein graphene flakes may be grown on the second primary particle.

A lithium battery including such a battery pack may have improved high-rate characteristics and lifetime characteristics, and thus may be applicable in an electric vehicle (EV), for example, in a hybrid vehicle such as a plug-in hybrid electric vehicle (PHEV).

According to another aspect, a device includes the porous silicon-containing composite according to any of the embodiments or a carbon composite including the porous silicon-containing composite according to any or the embodiments and a carbonaceous material.

The device may be, for example, a field emission device, a biosensor, a semiconductor device, or a thermoelectric device.

A field emission device is a device using migration of electrons. In general, a field emission device may include, at least, a reduction electrode, an emitter tip, and an oxidation electrode separated from the reduction electrode (refer to U.S. Pat. Nos. 7,009,331; 6,976,897; 6,911,767; and US 2006/0066217, the contents of which are incorporated in their entirety by reference). The emitter tip may emit electrons as a voltage is applied between the reduction electrode and the oxidation electrode. The electrons may migrate from the reduction electrode toward the oxidation electrode. A field emission device according to an embodiment of the present disclosure may be used for various purposes, for example, in ultrasonic vacuum tube equipment (for example, an X-ray tube), a power amplifier, an ion gun, a high-energy accelerator, a free-electron laser, and an electron microscope, and specifically, in a flat display device. A flat display device may be used as an alternative to a common cathode tube, and may also be applicable in a TV or a computer monitor.

The porous silicon-containing composite according to any of the embodiments or a carbon composite including the same may be used as the emitter tip.

A common emitter tip may be manufactured using a metal such as molybdenum (Mo) or a semiconductor such as silicon. One of the concerns with using the metal emitter is a comparatively high control voltage of about 100V required for emission. In addition, due to nonuniformity of such common emitter tips, current densities of individual pixels of a field emission device using the common emitter tips may be nonuniform.

When the porous silicon-containing composite or the carbon composite according to any of the embodiments is used as the emitter tip, improved field emission characteristics may be obtained.

The porous silicon-containing composite or the carbon composite according to any of the embodiments may be used to manufacture an electroluminescent device.

According to another aspect, there are provided a thermoelectric material and a thermoelectric device including the thermoelectric material, wherein the thermoelectric material includes the porous silicon-containing composite according to any of the embodiments or a carbon composite including the porous silicon-containing composite according to any of the embodiments and a carbonaceous material.

The thermoelectric material may have good electrical characteristics and consequently improved thermoelectric performance. The thermoelectric material may be used in a thermoelectric device, a thermoelectric module, or a thermoelectric system.

The porous silicon-containing composite or the carbon composite according to any of the embodiments may include graphene, and thus provide high electrical conductivity and low thermal conductivity, according to characteristics of the graphene, to a thermoelectric material when used therein. Accordingly, the thermoelectric material may have improved performance.

In the porous silicon-containing composite or carbon composite according to any of the above-described embodiments, crystalline characteristics and an electron structure may be changed at an interface between the metallic graphene and semi-conductive silicon to increase a Seebeck coefficient thereof and accelerate transfer of charge particles, which may consequently induce an increase in electrical conductivity and charge mobility. In addition, phonon scattering at the interface between the graphene and the silicon may be facilitated and it may become possible to control the thermal conductivity of the thermoelectric material.

As described above, the porous silicon-containing composite or carbon composite according to any of the above-described embodiments may be effectively used as a thermoelectric material. The thermoelectric device may be manufactured by processing the thermoelectric material into a shape, for example, by cutting. The thermoelectric device may be a p-type thermoelectric device. The thermoelectric device may be a structure formed by shaping the thermoelectric material in a predetermined shape, for example, in a rectangular parallelepiped shape.

The thermoelectric device may have a cooling effect when it is combined with an electrode and a current is applied thereto, and may be an element having a power generation effect based on a temperature difference.

Figure 9:
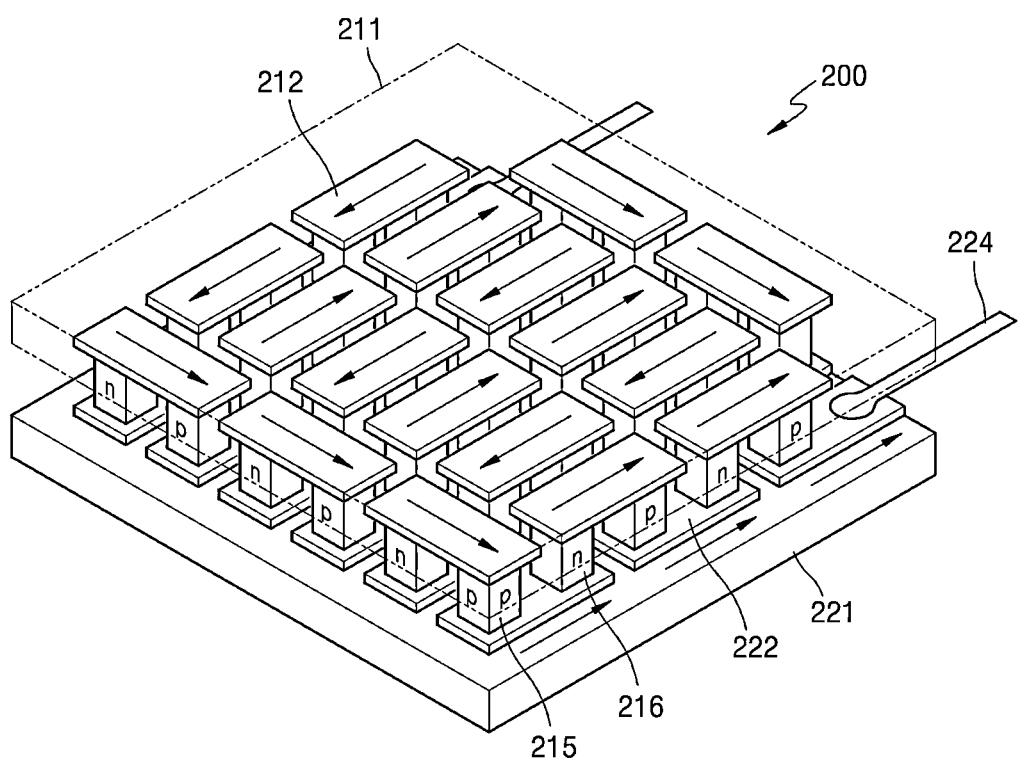
FIG. 9 is a schematic view of an embodiment of a thermoelectric module.

FIG. 9 is a view of a thermoelectric module 200 including the thermoelectric device according to an embodiment. Referring to FIG. 9, an upper electrode (first electrode) 212 and a lower electrode (second electrode) 222 are patterned on an upper insulating substrate 211 and a lower insulating substrate 221, respectively. The upper electrode 212 and the lower electrode 222 may contact a p-type thermoelectric component 215 and an n-type thermoelectric component 216. The upper electrode 212 and the lower electrode 222 may be connected to the outside of the thermoelectric device by a lead electrode 224. The p-type thermoelectric component 215 may be a thermoelectric device according to any of the above-described embodiments. The n-type thermoelectric component 216 may not be specifically limited, and may be any material known in the art.

The upper and lower insulating substrates 211 and 221 may include gallium arsenic (GaAs), sapphire, silicon, Pyrex, or quartz. The upper and lower electrodes 212 and 222 may include, for example, copper, aluminum, nickel, gold, or titanium, and may have various sizes. The upper and lower electrodes 212 and 222 may be formed using any common patterning method, for example, a lift-off semiconductor process, a deposition method, or a photolithography technique.

Figure 10:
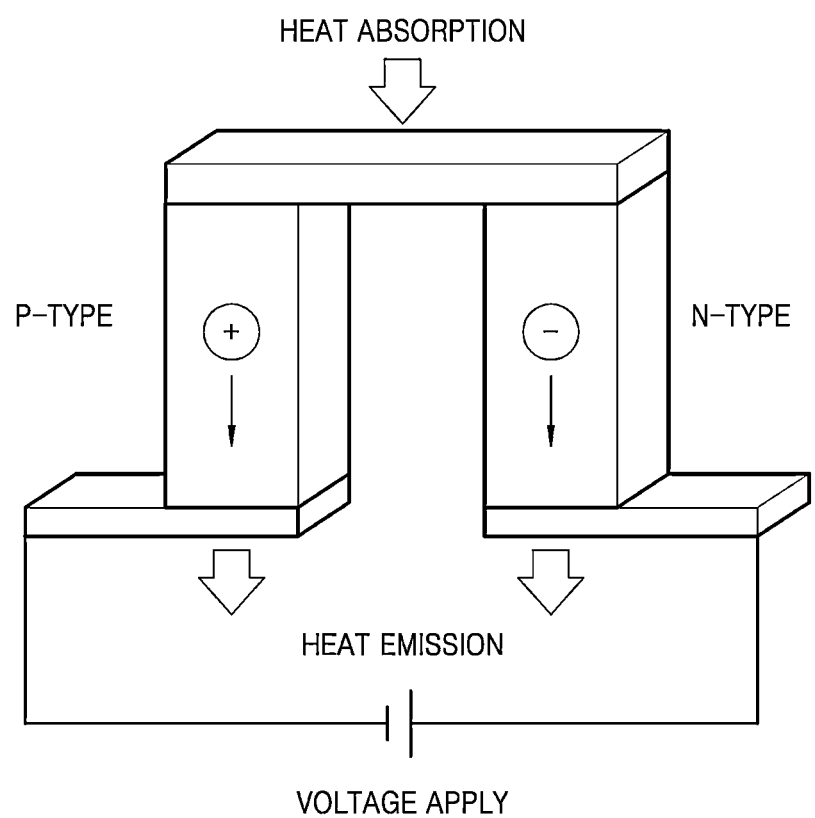
FIG. 10 is a schematic diagram illustrating an embodiment of a thermoelectric cooler using the Peltier effect.
Figure 11:
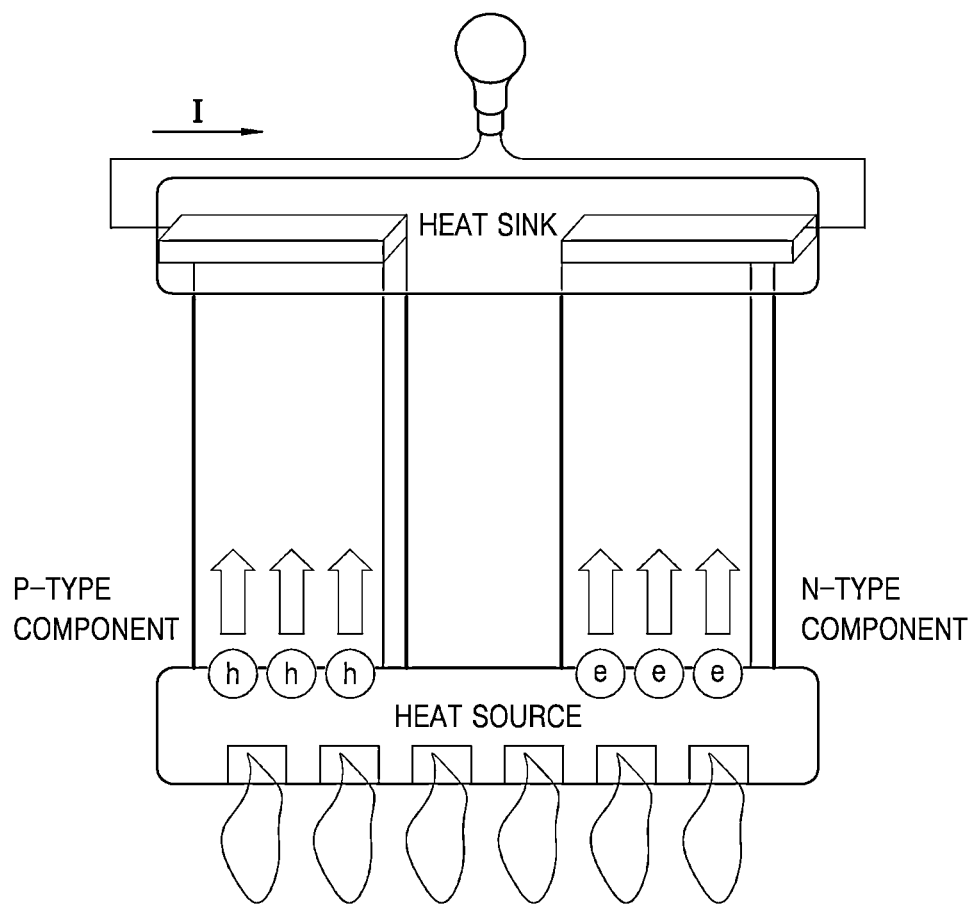
FIG. 11 is a schematic diagram illustrating an embodiment of a thermoelectric generator using the Seebeck effect.

One of the first and second electrodes 212 and 222 in the thermoelectric module may be exposed to a heat source as illustrated in FIGS. 10 and 11. In some embodiments, one of the first and second electrodes 212 and 222 in the thermoelectric device module may be electrically connected to a power supply source, or to the outside of the thermoelectric module, for example, to an electric device (for example, a battery) that consumes or stores electric power.

One of the first and second electrodes 212 and 222 in the thermoelectric module may be electrically connected to a power supply source.

Also disclosed is a biosensor, which includes the porous silicon-containing composite, or a carbon composite including the porous silicon-containing composite and a carbonaceous material.

The porous silicon-containing composite or carbon composite according to any of the embodiments may be used to manufacture an electrode of the biosensor.

Figure 12:
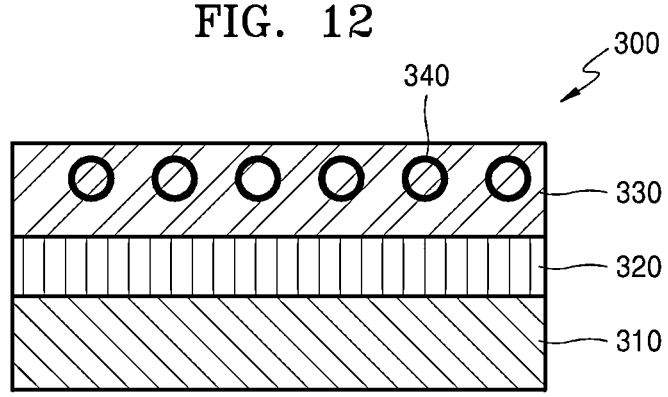
FIG. 12 is a cross-sectional view illustrating a structure of an embodiment an electrode of a biosensor.
Figure 13:
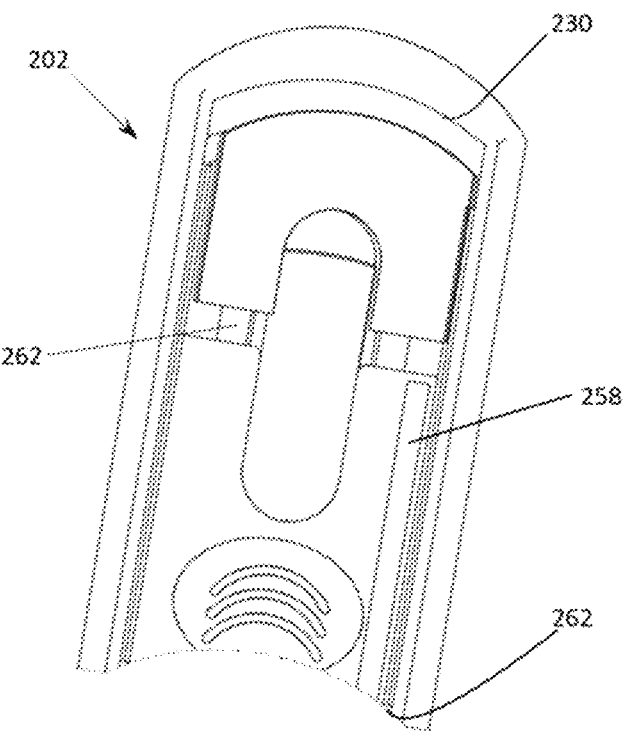
Figure 14:
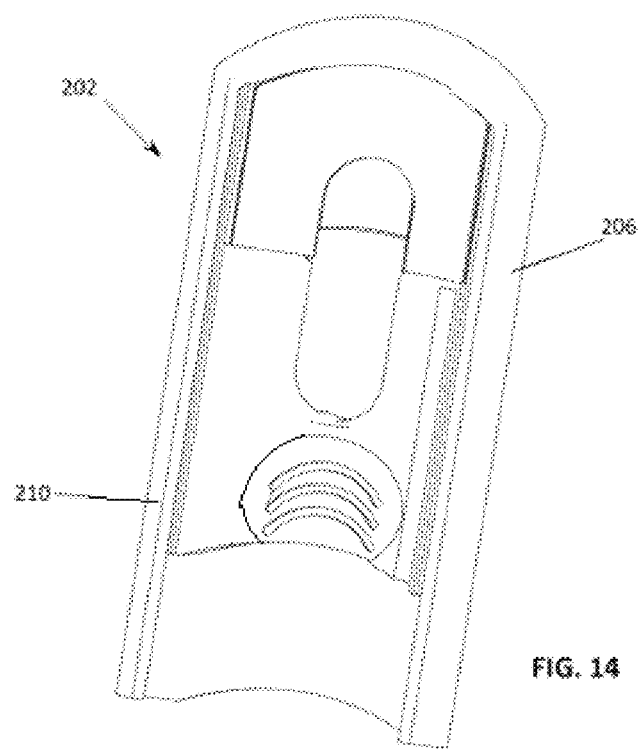

FIG. 12 is a cross-sectional view illustrating a structure of an electrode 300 of a biosensor according to an embodiment.

Referring to FIG. 12, the electrode 300 of a biosensor according to an embodiment may include a substrate 310, a second layer 330 on the substrate 310, the first layer 320 including the porous silicon-containing composite or carbon composite according to any of the embodiments, and a second layer 330 on the first layer 320. A biomaterial 340 may be supported by or fixed in the second layer 330 in a variety of manners.

The substrate 310 may be any plate on which graphene may be deposited or formed, and for example, may be glass, plastic, metal, ceramic, silicon, or a combination thereof. Types of the substrate 310 are not specifically limited, provided that graphene may be deposited or formed thereon.

The biomaterial 340 may be enzymes, aptamers, proteins, nucleic acids, microorganisms, cells, lipids, hormones, DNA, PNA, RNA, or a combination thereof. Any suitable biomaterials, not stated herein, may also be used.

Referring to FIG. 12, in the electrode 300 of a biosensor, the biomaterial 340 may be an enzyme, and the first layer 320 may be a layer able to support the enzyme or have the enzyme fixed therein. Although, in FIG. 12, an enzyme as the biomaterial 340 appears as being supported by or fixed in the second layer 330, the location of the enzyme is not limited thereto, and the enzyme may partially or entirely protrude through a surface of the second layer 330 and be exposed. When a biosensor has this structure including an enzyme with substrate specificity to selectively respond to a target molecule in a mixture, the biosensor may selectively sense an analyte (for example, blood sugar) to which the enzyme responds.

According to another aspect of the inventive concept, a semiconductor device includes the porous silicon-containing composite according to any of the embodiments or a carbon composite including the porous silicon-containing composite and a carbonaceous material.

The porous silicon-containing composite or carbon composite according to any of the embodiments may be used to manufacture an electrode of the semiconductor device.

Also disclosed is a thermoelectric material and a thermoelectric device including the thermoelectric material, wherein the thermoelectric material includes the porous silicon-containing composite according to any of the embodiments or a carbon composite including the porous silicon-containing composite and a carbonaceous material.

The performance of the thermoelectric material is evaluated using a dimensionless figure of merit (ZT), which is defined by Equation 2.

$$ZT=(S^2\sigma T)/k \qquad \text{Equation 2}$$

In Equation 2, ZT is a figure of merit, S is a Seebeck coefficient, $\sigma$ is electrical conductivity, T is an absolute temperature, and k is thermal conductivity.

As represented in Equation 1, a higher ZT value of a thermoelectric material may be obtained by increasing the Seebeck coefficient (S) and the electrical conductivity ($\sigma$) of the thermoelectric material, i.e., a power factor ($S^2\sigma$), and reducing the thermal conductivity (k) of the thermoelectric material.

An embodiment will now be described in further detail with reference to the following examples. However, these examples are only for illustrative purposes and are not intended to limit the scope of the one or more embodiments of the disclosure.

EXAMPLES

Preliminary Preparation Example 1: Preparation of First Primary Particle

Needle-like silicon was pulverized with a wet bead mill to obtain plate- and needle-like silicon (first silicon)(first primary particle) having a silicon suboxide ($SiO_x$) (wherein 0<x<2) layer (having a thickness of about 0.1 nm to about 10 nm) on a surface thereof, a length (D90) of about 150 nm, and a thickness of about 40 nm. The rotation speed was 1 to 20 m/s, for example, about 10 m/s, and the rotation speed was 1 hour to 72 hours, for example, about 10 hours.

Preparation Example 1

25 parts by weight of silicon including a 9:1 mixture (by weight) of the first primary particle obtained according to Preliminary Preparation Example 1 and spherical silicon (second silicon)(second primary particle, available from NanoAmor) having an average diameter of about 50 nm obtained by vapor phase synthesis was mixed with 10 parts by weight of stearic acid and 65 parts by weight of isopropyl alcohol to obtain a composition. The composite was spray-dried and then further dried to obtain porous silicon composite secondary particles having an average particle diameter of about 4.5 μm. A silicon suboxide ($SiO_x$) (wherein 0<x<2) layer (having a thickness of about 0.1 nm to about 10 nm) was on a surface of the second primary particle.

The spray-drying was performed using a spray drier (MMSD Micro Mist Spray Dryers, Fujisaki Electric) by controlling a spray nozzle size, pressure under a $N_2$ atmosphere, and a powder spray atmosphere temperature (about 200° C.) to remove isopropyl alcohol and thereby prepare porous silicon secondary particles. The spray nozzle size was controlled to about 150 μm, and the spray nozzle pressure was about 0.6 MPa.

The porous silicon secondary particles were loaded into a reactor. After purging the reactor with a nitrogen gas, methane ($CH_4$) as a reaction gas was flowed into the reactor to create an atmosphere of the reaction gas. A pressure level inside the reactor which was reached by flow of the gas was about 1 atm. The internal temperature of the reactor was increased to about 1000° C. (at a rate of about 23° C./min) under the atmosphere of the gas, and thermal treatment was performed while maintaining the temperature for about 1 hour and continuously flowing the gas into the reactor. The resulting product was left for about 3 hours. Then, the supply of the gas was stopped, and the reactor was cooled down to room temperature (25° C.) and then purged with nitrogen to thereby obtain a porous silicon-containing composite.

A total amount of a first graphene and a second graphene in the porous silicon-containing composite was about 25 parts by weight with respect to 100 parts by weight of a total weight of the porous silicon-containing composite.

Preparation Example 2

A porous-silicon containing composite was prepared in the same manner as in Preparation Example 1, except that a mixed weight ratio of the first primary particle to the second primary particle was about 8:2.

Preparation Examples 3-4

Porous silicon-containing composites were prepared in the same manner as in Preparation Example 1, except that first primary particle and second primary particle having sizes as represented in Table 1 were used.

TABLE 1

| Example | Size of first primary particle (nm) | Size of second primary particle (nm) | Mixed ratio of first primary particle to second primary particle (by weight) |
|---|---|---|---|
| Preparation Example 1 | 150 | 50 | 9:1 |
| Preparation Example 2 | 150 | 50 | 8:2 |
| Preparation Example 3 | 120 | 80 | 9:1 |
| Preparation Example 4 | 180 | 100 | 9:1 |

In Table 1, the size of the first primary particle represent average length of the first primary particle, and the size of the second primary particle represent average diameter of the second primary particle.

Comparative Preparation Example 1

A porous silicon-containing composite was obtained in the same manner as in Preparation Example 1, except that only the first primary particle was used.

Comparative Preparation Example 2

A porous silicon-containing composite mixture was obtained by mixing the porous silicon-containing composite of Comparative Preparation Example 1 and a porous silicon-containing composite of Comparative Preparation Example 3 in a weight ratio of about 80:20.

Comparative Preparation Example 3

25 parts by weight of spherical silicon (second primary particle, available from NanoAmor) having an average diameter of about 50 nm obtained by vapor phase synthesis was mixed with 10 parts by weight of stearic acid and 65 parts by weight of isopropyl alcohol to obtain a composition. The composition was spray-dried and then further dried to obtain porous silicon composite particles having an average particle diameter of about 4.5 μm. A silicon suboxide ($SiO_x$) (wherein 0<x<2) layer (having a thickness of about 0.1 nm) was on a surface of the spherical silicon.

The spray-drying was performed using a spray drier (MMSD Micro Mist Spray Dryers, Fujisaki Electric) by controlling a spray nozzle size, pressure under a $N_2$ atmosphere, and a powder spray atmosphere temperature (about 200° C.) to remove isopropyl alcohol and thereby prepare porous silicon secondary particles.

The porous silicon secondary particles were loaded into a reactor. After purging the reactor with a nitrogen gas, methane ($CH_4$) as a reaction gas was flowed into the reactor to create an atmosphere of the reaction gas. A pressure level inside the reactor which was reached by flow of the gas was about 1 atm. The internal temperature of the reactor was increased to about 1000° C. (at a rate of about 23° C./min) under the atmosphere of the gas, and thermal treatment was performed while maintaining the temperature for about 1 hour and continuously flowing the gas into the reactor. The resulting product was left for about 3 hours. Then, the supply of the gas was stopped, and the reactor was cooled down to room temperature (25° C.) and then purged with nitrogen to thereby obtain a porous silicon-containing composite.

Example 1: Manufacture of Negative Electrode and Full Cell

The porous silicon-containing composite prepared in Preparation Example 1, graphite, lithium polyacrylate (Li-PAA), and deionized (DI) water as a solvent were mixed to prepare a slurry. A ratio of a mixture of the porous silicon-containing composite of Preparation Example 1 and graphite to the lithium polyacrylate was about 95:5 by weight on a solid basis. A ratio of the porous silicon-containing composite of Preparation Example 1 to graphite in the mixture was about 15:85 by weight.

After the slurry was applied to a copper (Cu) foil using a doctor blade to form a film having a thickness of about 40 μm, the film was vacuum-dried at about 120° C. for about 2 hours and roll-pressed to thereby manufacture a negative electrode.

A positive electrode was manufactured using a slurry obtained by mixing $LiNi_{0.6}Co_{0.2}Mn_{0.2}O_2$, $LiNi_{0.6}Co_{0.2}Al_{0.2}O_2$, Denka Black, polyvinylidene fluoride (PVdF) as a binder, and N-methylpyrrolidone (NMP) as a solvent. A mixed ratio of $LiNi_{0.6}Co_{0.2}Mn_{0.2}O_2$, $LiNi_{0.6}Co_{0.2}Al_{0.2}O_2$, Denka Black, and PVdF as a binder in the slurry was about 75:9:3:3 by weight. The slurry was applied to an aluminum (Al) foil using a doctor blade to form a film having a thickness of about 40 μm. The film was vacuum-dried at about 120° C. for about 2 hours and roll-pressed, thereby manufacturing the positive electrode.

A coin full cell was manufactured using the negative electrode and the positive electrode. A polypropylene membrane (CELLGARD 3510) was used as a separator. An electrolyte used was a solution of 1.3M $LiPF_6$ in a mixed solvent of ethylene carbonate (EC), diethyl carbonate (DEC), and fluoroethylene carbonate (FEC) in a volume ratio of about 50:25:25.

Examples 2-4: Manufacture of Negative Electrode and Full Cell

Negative electrodes and full cells were manufactured in the same manner as in Example 1, except that the porous silicon-containing composites of Preparation Examples 2 to 4 were used, respectively, instead of the porous silicon-containing composite of Preparation Example 1.

Example 5: Manufacture of Negative Electrode and Coin Half-Cell

The porous silicon-containing composite prepared in Preparation Example 1, graphite, lithium polyacrylate (Li-PAA), and deionized (DI) water as a solvent were mixed to prepare a slurry. A ratio of a mixture of the porous silicon-containing composite of Preparation Example 1 and graphite to the lithium polyacrylate was about 95:5 by weight on a solid basis. A ratio of the porous silicon-containing composite of Preparation Example 1 to graphite in the mixture was about 15:85 by weight.

After the slurry was applied to a copper (Cu) foil using a doctor blade to form a film having a thickness of about 40 μm, the film was vacuum-dried at about 120° C. for about 2 hours and roll-pressed to thereby manufacture a negative electrode.

A coin half-cell was manufactured using the negative electrode and lithium metal as a counter electrode. A polypropylene membrane (Cellgard 3510) was used as a separator. An electrolyte used was a solution of 1.3M $LiPF_6$ in a mixed solvent of ethylene carbonate (EC), diethyl carbonate (DEC), and fluoroethylene carbonate (FEC) in a volume ratio of about 2:6:2.

Examples 6-8: Manufacture of Negative Electrode and Coin Half-Cell

Negative electrodes and coin half-cells were manufactured in the same manner as in Example 5, except that the porous silicon-containing composites of Preparation Examples 2 to 4 were used, respectively, instead of the porous silicon-containing composite of Preparation Example 1.

Comparative Example 1: Manufacture of Negative Electrode and Full Cell

A negative electrode and a full cell were manufactured in the same manner as in Example 1, except that the porous silicon-containing composite of Comparative Preparation Example 1 was used, instead of the porous silicon-containing composite of Preparation Example 1.

Comparative Examples 2-3: Manufacture of Negative Electrode and Full Cell

Negative electrodes and full cells were manufactured in the same manner as in Example 1, except that the materials prepared in Comparative Preparation Examples 2 and 3 were used, respectively, instead of the porous silicon-containing composite of Preparation Example 1.

Comparative Examples 4-6: Manufacture of Negative Electrode and Coin Half-Cell Negative electrodes and coin half-cells were manufactured in the same manner as in Example 5, except that the materials prepared in Comparative Preparation Examples 1 to 3 were used, respectively, instead of the porous silicon-containing composite of Preparation Example 1.

Evaluation Example 1: Oxygen Content

The porous silicon-containing composites prepared in Preparation Examples 1 and 2, and porous silicon-containing composite prepared in Comparative Preparation Example 1 and porous silicon-containing composite prepared in Comparative Preparation Example 3 were analyzed by X-ray photoelectron spectroscopy (XPS) to analyze oxygen and carbon contents. The analysis results are shown in Table 2.

The XPS analysis was performed using a Quantum 2000 (available from Physical Electronics Inc.) (Acceleration voltage: 0.5~15 kV, 300 W, Energy resolution: about 1.0 eV, and Sputter rate: 0.1 nm/min).

TABLE 2

| Example | Oxygen (atomic %) |
| --- | --- |
| Preparation Example 1 | 5.8 |
| Preparation Example 2 | 5.2 |
| Comparative Preparation Example 1 | 6.9 |
| Comparative Preparation Example 3 | 1.0 |

In Table 2, the oxygen content is defined as an oxygen content corresponding to O1s peaks.

Referring to Table 2, the porous silicon-containing composites of Preparation Examples 1 and 2 had reduced oxidation degrees, as compared with that of Comparative Preparation Example 1. The porous silicon-containing composite of Comparative Preparation Example 3, prepared using spherical silicon obtained by vapor phase synthesis, was found to have a small oxygen content and the lowest oxidation degree.

Evaluation Example 2: Specific Surface Area and Density

Specific surface areas and densities of the porous silicon-containing composites obtained in Preparation Examples 1 and 2 and Comparative Preparation Examples 1 and 3 were measured. The results are shown in Table 3. The specific surface areas were measured using the BET method, and the densities were measured before each sample was pressed, by using an envelope pycnometer.

TABLE 3

| Example | Specific surface area (m$^2$/g) | Density (g/cc) |
| --- | --- | --- |
| Preparation Example 1 | 6.9 | 1.18 |
| Preparation Example 2 | 41.6 | 1.11 |
| Comparative Preparation Example 1 | 5.9 | 1.09 |
| Comparative Preparation Example 3 | 128.3 | 0.95 |

Referring to Table 3, the porous silicon-containing composite of Comparative Preparation Example 3 prepared using the silicon obtained by vapor phase synthesis was found to have a very large specific surface area.

Compared to the porous silicon-containing composite of Comparative Preparation Example 3, the porous silicon-containing composites of Preparation Examples 1 and 2 had remarkably smaller specific surface areas, which may suppress side reaction with electrolyte.

The porous silicon-containing composites of Preparation Examples 1 and 2 were found to have higher density, as compared with that of Comparative Preparation Example 1, with the expectation of improved particle intensities of the porous silicon-containing composites of Preparation Examples 1 and 2.

Evaluation Example 3: Transmission Electron Microscopy (TEM) Analysis

The porous silicon-containing composites obtained in Preparation Example 1 and Comparative Preparation Example 1 were analyzed using transmission electron microscopy (TEM) with a Titan cubed G2 60-300 (FEI).

Figure 3A:
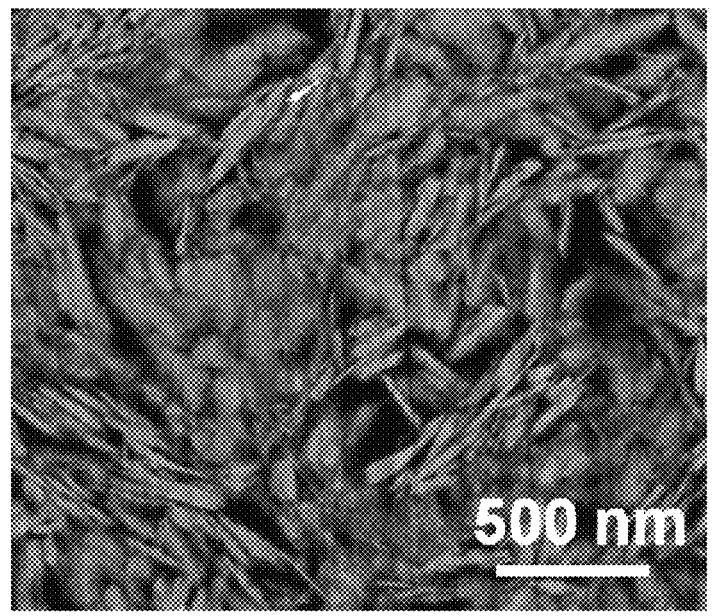
FIGS. 3A to 3C are images showing the results of transmission electron microscope (TEM) analysis of a porous silicon-containing composite according to Comparative Preparation Example 1.
Figure 3B:
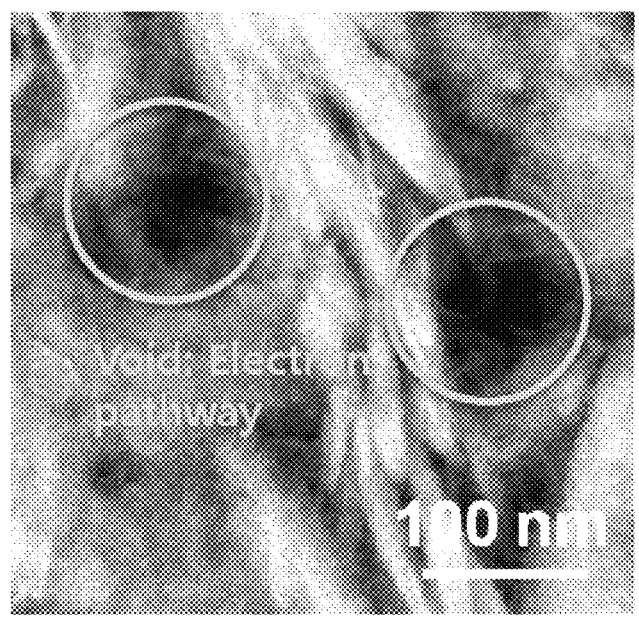
Figure 3C:
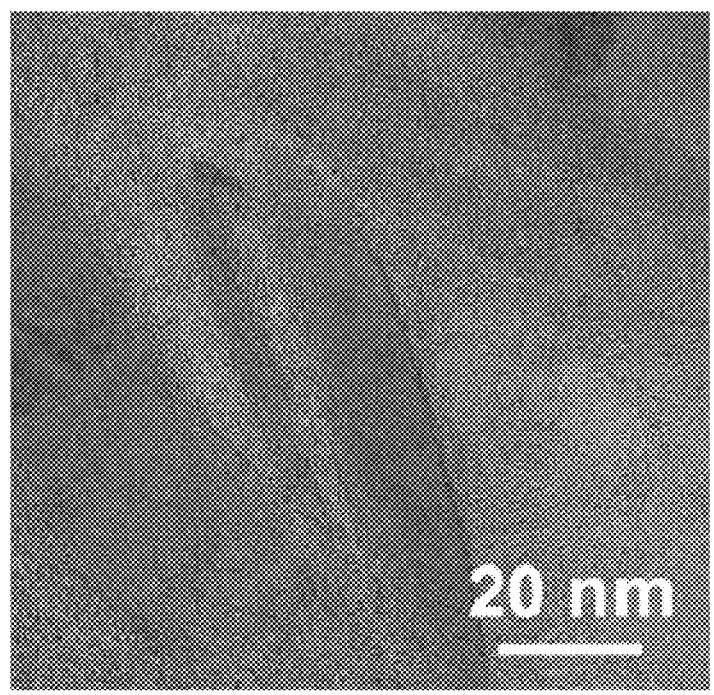

TEM analysis results of a surface of the porous silicon-containing composite of Comparative Preparation Example 1 are shown in FIGS. 3A to 3C. TEM analysis results of the porous silicon-containing composite of Preparation Example 1 are shown in FIGS. 4A to 4D.

Figure 4A:
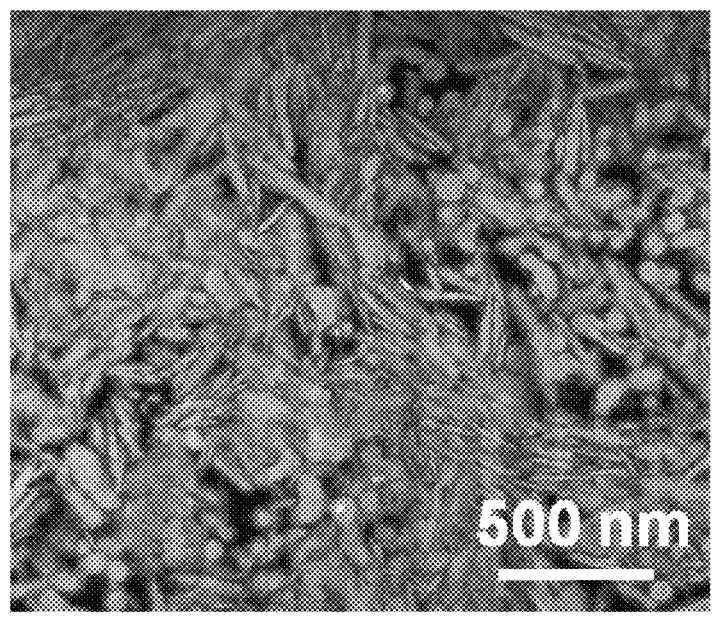
FIGS. 4A to 4D are images showing the results of transmission electron microscopy (TEM) analysis of a surface of a porous silicon-containing composite according to Preparation Example 1.
Figure 4B:
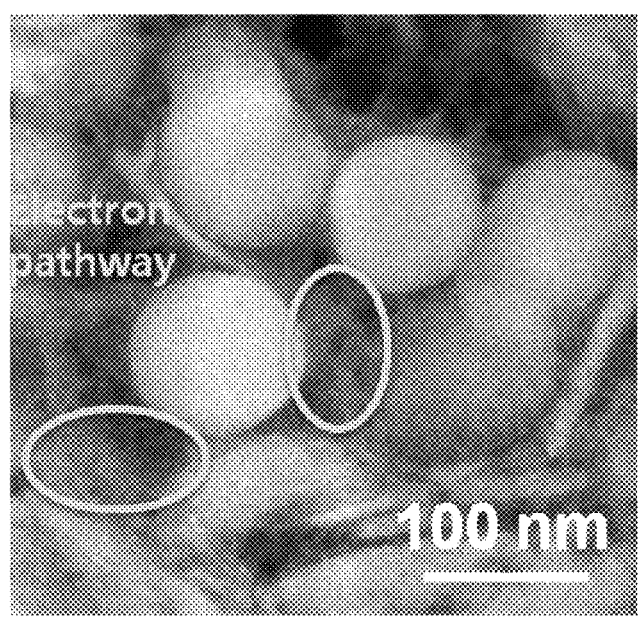

Referring to FIGS. 4A and 4B, the porous silicon-containing composite of Preparation Example 1 was found to include spherical second primary particle and needle- and plate-shaped first primary particle, and thus have reduced porosity, thereby providing improved electronic conductivity, as compared with the porous silicon-containing composite of Comparative Preparation Example 1.

Figure 4C:
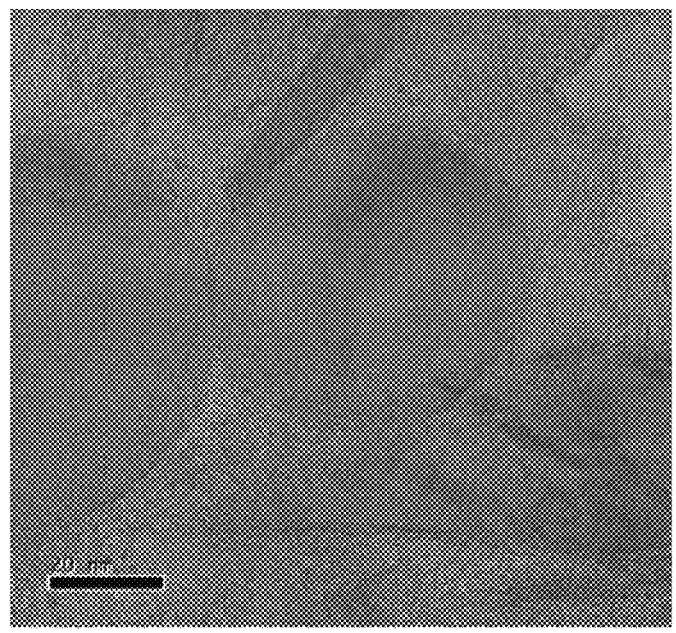
Figure 4D:
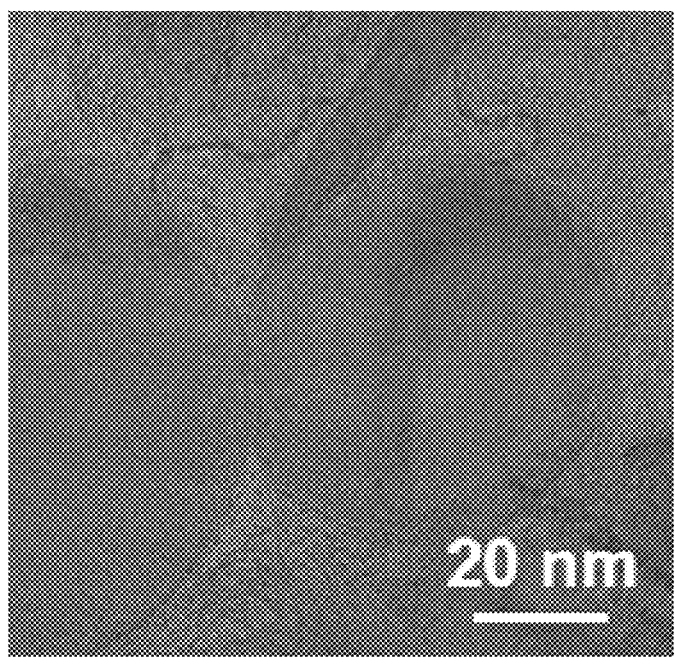

The first primary particle and the second primary particle may form a network through second graphene, as shown in FIG. 4D, and a structure in which the second primary particle is embedded among the first primary particle. In the porous silicon-containing composite of Comparative Preparation Example 1, disconnected electron pathway regions were observed as shown in FIG. 3B, and only one type of silicon having a plate-like and needle-like form was observed as shown in FIG. 3C.

As shown in FIG. 4C, the second graphene and the silicon suboxide were very close to each other with an adherency of about 1 nm or less, and the second graphene on the first primary particle had a layered shape, and the second graphene on the first primary particle had a single layer shape with flakes grown thereon.

Evaluation Example 4: Raman Analysis

The porous silicon-containing composites of Preparation Example 1 and Comparative Preparation Examples 1 and 3 were analyzed by Raman analysis with a Raman 2010 Spectra (NT-MDT Development Co.) (Laser system: 473 nm, 633 nm, 785 nm, Lowest Raman shift: ~50 cm$^{-1}$, Spatial resolution: about 500 nm).

An intensity ratio of D peak to G peak (D/G) was calculated based on the Raman analysis results. The results are shown in Table 4.

In Raman spectra of graphene, peaks appear at 1350 cm$^{-1}$, 1580 cm$^{-1}$, and 2700 cm$^{-1}$, giving information about thickness, crystallinity and charge doping state of the graphene. The peak at 1580 cm$^{-1}$, also called a G-mode peak, is due to the oscillation mode corresponding to stretching of C—C bond, and energy of the G-mode is determined by the density of excessive charges doped on the graphene. The peak at 2700 cm$^{-1}$, also called a 2D-mode peak, is useful in evaluation of the thickness of graphene. The peak at 1350 cm$^{-1}$, called a D-mode peak, appears when a SP$^2$ crystal structure has a defect. The D/G intensity ratio gives information on the degree of disorder in the crystals of graphene.

TABLE 4

| Example | D/G Intensity ratio |
| --- | --- |
| Preparation Example 1 | 1.19 |
| Comparative Preparation Example 1 | 1.09 |
| Comparative Preparation Example 3 | 1.72 |

Evaluation Example 4: Charge and Discharge Characteristics of Coin Full Cell

Charge and discharge characteristics of the coin full cells of Example 1, Example 2, and Comparative Examples 1 to 3 were evaluated in the following manner. Charge and discharge cycles were repeated 100 times under the following charging and discharging conditions: (Charge: 1.0 C/Cutoff: 4.2V-0.01 C, Discharge: 1.0 C/Cutoff: 2.5V).

The coin full cells were charged at about 25° C. with a constant current of 0.1 C rate until a voltage of 4.2V (with respect to Li) was reached, and then with a constant voltage of 4.2V (constant voltage mode) until a cutoff current of 0.01 C rate was reached, followed by discharging with a constant current of 0.1 C rate until a voltage of 2.5V (with respect to Li) was reached ($1^{st}$ cycle, formation cycle).

After the $1^{st}$ cycle, the coin full cells were charged at about 25° C. with a constant current of 0.2 C rate until a voltage of 4.2V (with respect to Li) was reached, and then with a constant voltage of 4.2V (constant voltage mode) until a cutoff current of 0.01 C rate was reached, followed by discharging with a constant current of 0.2 C rate until a voltage of 2.5V (with respect to Li) was reached ($2^{nd}$ cycle, formation cycle).

After the $2^{nd}$ cycle, the coin full cells were charged at about 25° C. with a constant current of 1.0 C rate until a voltage of 4.2V (with respect to Li) was reached, and then with a constant voltage of 4.2V (constant voltage mode) until a cutoff current of 0.01 C rate was reached, followed by discharging with a constant current of 1.0 C rate until a voltage of 2.5V (with respect to Li) was reached ($3^{rd}$ cycle). This cycle was repeated 100 times, to the $103^{rd}$ cycle, under the same condition. A rest time of about 10 minutes was allowed after each charge and discharge cycle through the entire charge and discharge cycles.

Some of the charge and discharge test results are shown in Table 5. In Table 5, charge and discharge efficiency is for 0.1 C condition of the first cycle of the coin full cells, and specific capacity is about 0.2 C discharge capacity after 0.1 C charge/discharge of the coin full cells.

A discharge retention at the $103^{rd}$ cycle is defined using Equation 3.

$$\text{Capacity retention [\%]} = [\text{Discharge capacity at } 103^{rd} \text{ cycle/Discharge capacity at } 3^{rd} \text{ cycle}] \times 100\% \quad \text{Equation 3}$$

TABLE 5

| Example | Specific capacity (mAh/g) | Initial efficiency (%) | Charge and discharge efficiency (%) | Lifespan (%) |
|---|---|---|---|---|
| Example 1 | 1700 | 89.4 | 85.8 | 93.3 |
| Example 2 | 1800 | 86.8 | 85.0 | 84.6 |
| Comparative Example 1 | 1560 | 86.6 | 84.8 | 92.1 |
| Comparative Example 2 | 1710 | 85.5 | 84.5 | 83.3 |
| Comparative Example 3 | 2300 | 82.2 | 84.1 | 65.6 |

Referring to Table 5, the coin full cells of Examples 1 and 2 were found to have equivalent or improved lifespan characteristics, and improved initial efficiency, as compared with the coin full-cells of Comparative Examples 1 to 3. The coin full cell of Example 2 was found to have poor lifetime characteristics, but have improved initial efficiency and charge and discharge efficiency, as compared with the coin full cell of Comparative Example 1, which is more advantageous for practical application.

Evaluation Example 6: Charge and Discharge Characteristics of Coin Half-Cell

Charge and discharge characteristics of the coin half-cells of Example 5 and Comparative Examples 4 and 5 were evaluated in the following manner. The coin half-cells were charged at about 25° C. with a constant current of 0.1 C rate until a voltage of 0.01V (with respect to Li) was reached, and then with a constant voltage of 0.01V (constant voltage mode) until a cutoff current of 0.01 C rate was reached, followed by discharging with a constant current of 0.1 C rate until a voltage of 1.5V (with respect to Li) was reached (formation cycle).

After the formation cycle, the coin half-cells were charged at about 25° C. with a constant current of 0.1 C rate until a voltage of 0.01V (with respect to Li) was reached, and then with a constant voltage of 0.01V (constant voltage mode) until a cutoff current of 0.01 C rate was reached, followed by discharging with a constant current of 0.2 C rate until a voltage of 1.5V (with respect to Li) was reached ($1^{st}$ cycle).

After the $1^{st}$ cycle, the coin half-cells were charged at about 25° C. with a constant current of 0.2 C rate until a voltage of 0.01 V (with respect to Li) was reached, and then discharged with a constant current of 1 C rate until a voltage of 1.5V (with respect to Li) was reached ($2^{nd}$ cycle).

After the $2^{nd}$ cycle, the coin half-cells were charged at about 25° C. with a constant current of 0.5 C rate until a voltage of 0.01 V (with respect to Li) was reached, and then discharged with a constant current of 0.5 C rate until a voltage of 1.5V (with respect to Li) was reached ($3^{rd}$ cycle).

After the $3^{rd}$ cycle, the coin half-cells were charged at about 25° C. with a constant current of 1 C rate until a voltage of 0.01 V (with respect to Li) was reached, and then discharged with a constant current of 1 C rate until a voltage of 1.5V (with respect to Li) was reached ($4^{th}$ cycle).

A rest time of about 10 minutes was allowed after each charge and discharge cycle through the entire charge and discharge cycles.

High-rate characteristics are defined using Equation 4.

$$\text{High-rate characteristic [\%]} = [\text{Discharge capacity at } 4^{th} \text{ cycle(1C rate)/Discharge cycle at } 1^{st} \text{ cycle (0.1C rate)}] \times 100\% \quad \text{Equation 4}$$

Figure 5:
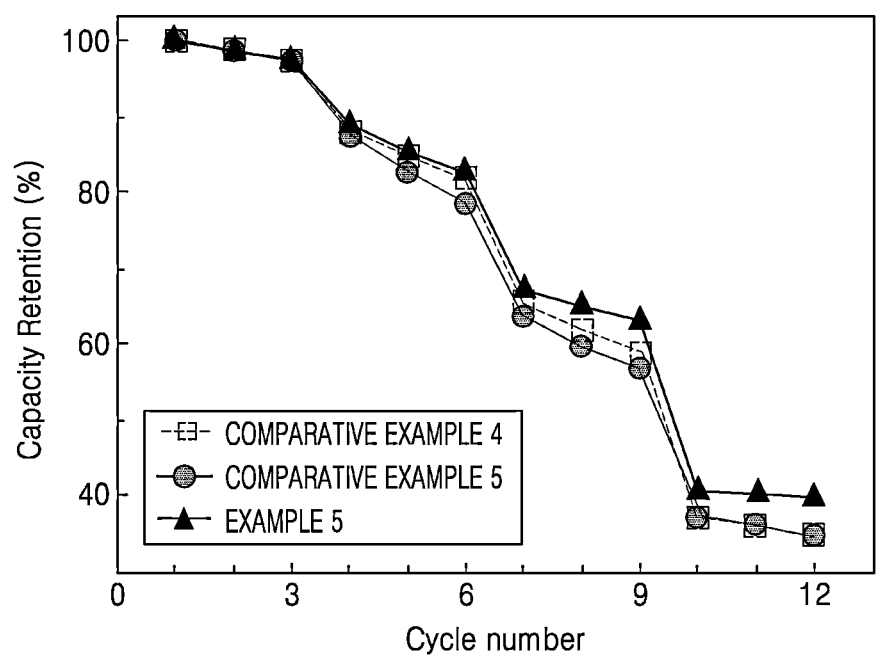
FIG. 5 is a graph of capacity retention (percent, %) versus cycle number showing high-rate characteristics of coin half-cells of Example 5 and Comparative Examples 4 and 5.

Some of the charge and discharge evaluation results are shown in Table 6 and FIG. 5. FIG. 5 is a graph showing high-rate characteristics of the coin half-cells of Example 5 and Comparative Examples 4 and 5.

TABLE 6

| Example | High-rate characteristic (%) (1 C/0.1 C) |
|---|---|
| Example 5 | 40.1 |
| Comparative Example 4 | 36.0 |
| Comparative Example 5 | 35.9 |

Referring to Table 6, the coin half-cell of Example 5 was found to have improved high-rate characteristics, as compared with the coin half-cells of Comparative Examples 4 and 5.

Figure 6A:
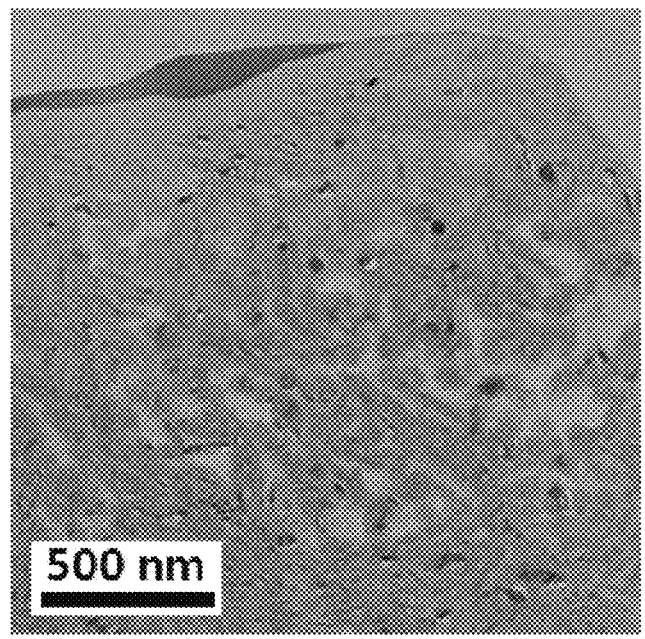
FIGS. 6A to 6C are results of scanning electron microscopy (SEM) analysis of a coin full cell of Example 1, showing surface states of a negative electrode at an initial stage and after the $1^{st}$ and $20^{th}$ charge-discharge cycles, respectively.
Figure 6B:
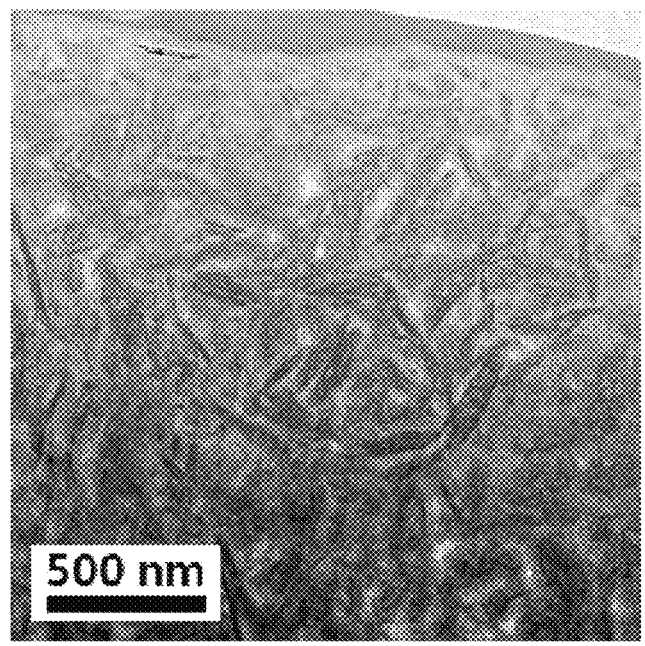
Figure 6C:
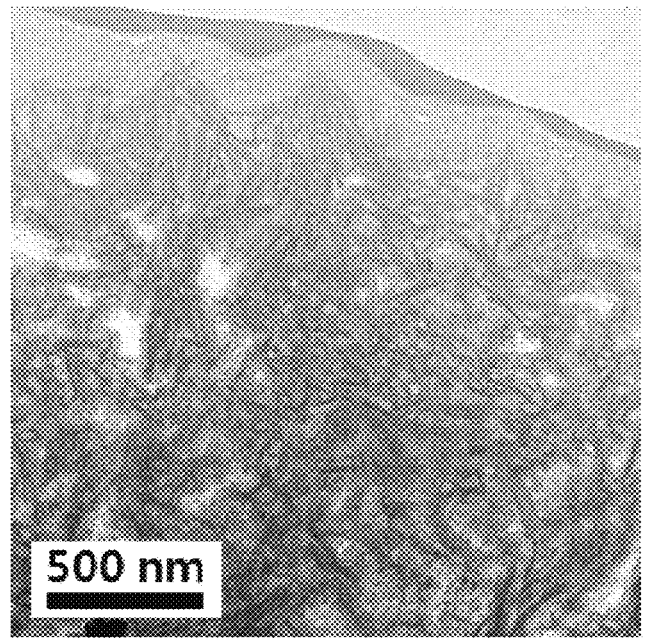

Evaluation Example 7: Scanning Electron Microscopy (SEM) Analysis after Charge and Discharge Cycle An evaluation of the coin full cell of Example 1 was performed by scanning electron microscopy (SEM) of a surface and cross-section of the negative active material in the negative electrode before charging and discharging in the same manner as in Evaluation Example 5, after the 1st cycle, and after repeated charging and discharging up to the 20th cycle. The evaluation results are shown in FIGS. 6A to 6C. FIG. 6A is a SEM image of the negative active material at an initial state before charging and discharging, FIG. 6B is a SEM image of the negative active material after the 1st cycle, and FIG. 6C is a SEM image of the negative active material after 20 charge-discharge cycles.

Referring to FIGS. 6A to 6C, it was found that when the number of charge-discharge cycles was less than 100, the secondary particles maintained a varying silicon-containing structure including the needle- and plate-like first primary particle (first silicon) and the spherical second primary particle (second silicon). When such a negative active material which is structurally stable after charging and discharging is used, a battery having low expansion and excellent durability may be manufactured.

Evaluation Example 8: Charge and Discharge Test

Charge and discharge characteristics of the coin half-cells of Example 5 and Comparative Examples 4 and 5 were evaluated in the following manner under the following charging and discharging conditions: (Charge: 1.0 C/Cutoff: 0.01V-0.01 C, Discharge: 1.0 C/Cutoff: 1.5V).

Figure 7A:
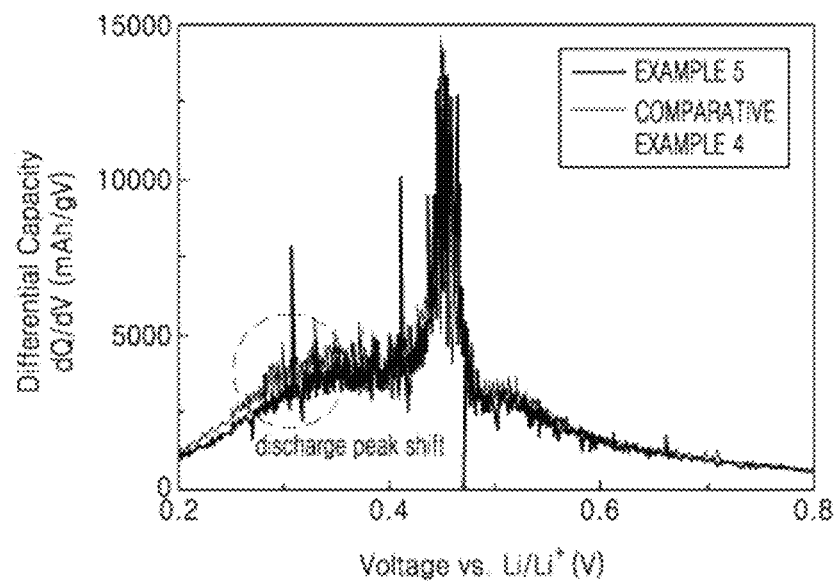
FIG. 7A is a graph of differential capacity (dQ/dV, mAh/gV) versus voltage (Volts, V vs. Li/Li$^+$) illustrating evaluation results of differential charge and discharge characteristics (dQ/dV) at the $1^{st}$ cycle of the coin half-cells of Example 5 and Comparative Example 4.
Figure 7B:
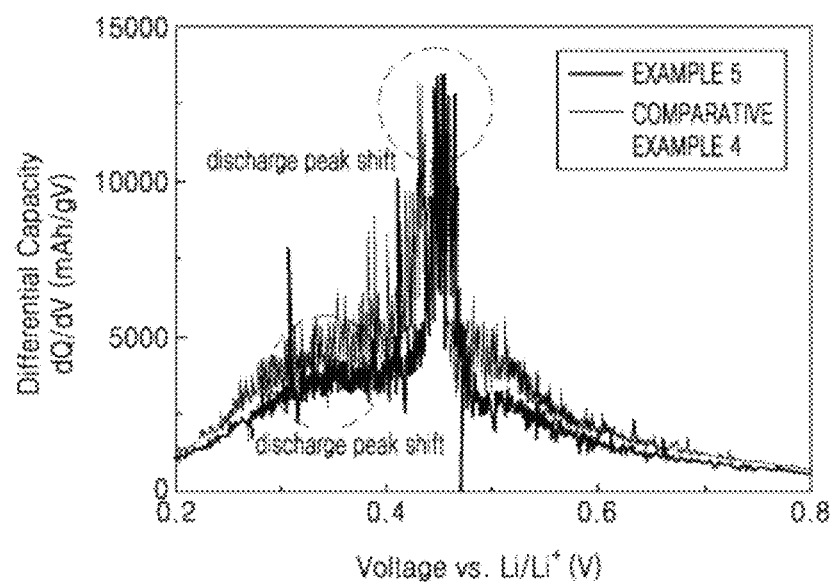
FIG. 7B is a graph of differential capacity (dQ/dV, mAh/gV) versus voltage (Volts, V vs. Li/Li$^+$) illustrating evaluation results of the differential charge and discharge characteristics (dQ/dV) at the $1^{st}$ cycle of the coin half-cells of Example 5 and Comparative Example 5.

The differential charge and discharge characteristics (dQ/dV) of each coin half-cell showing a lithium-silicon reaction potential difference at the 1st cycle were evaluated. The results are shown in FIGS. 7A and 7B. FIG. 7A illustrates evaluation results of the differential charge and discharge characteristics (dQ/dV) at the 1st cycle of the coin half-cells of Example 5 and Comparative Example 4. FIG. 7B illustrates evaluation results of the differential charge and discharge characteristics (dQ/dV) at the 1st cycle of the coin half-cells of Example 5 and Comparative Example 5.

Referring to FIGS. 7A and 7B, the coin half-cells of Comparative Examples 4 and 5 were found to have discharge peaks shifted with respect to a discharge peak of the coin half-cell of Example 5, indicating that structural changes occurred in the coin half-cells of Comparative Examples 4 and 5.

In the dQ/dV plot at the 1st cycle of the coin half-cell of Example 5, smooth oxidation-reduction peaks were observed in a voltage range of about 0.2 V to about 0.8 V.

As described above, a lithium battery having improved capacity, initial efficiency, lifetime characteristics and high-rate characteristics may be manufactured by using an electrode including a porous silicon-containing composite according to any of the embodiments.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:
1. A porous silicon-containing composite comprising:
   a porous core comprising a porous silicon composite secondary particle; and
   a first shell on an outer surface of the porous core, the first shell comprising a first graphene,
   wherein the porous silicon composite secondary particle comprises an aggregate of
      a first primary particle comprising silicon,
      a second primary particle comprising a structure, and
      a second shell comprising a second graphene on at least one surface of the first primary particle and the second primary particle, and
   wherein at least one of a shape and a degree of oxidation of the first primary particle and the second primary particle are different,
   wherein the first primary particle has an oxygen content of about 3 atomic percent to about 15 atomic percent, based on a total content of the first primary particle, the second primary particle has an oxygen content of about 0.01 atomic percent to 3 atomic percent, based on a total content of the second primary particle.

2. The porous silicon-containing composite of claim 1, wherein the structure comprises silicon, germanium, tin, aluminum, zinc, antimony, an alloy thereof, or a combination thereof.

3. The porous silicon-containing composite of claim 1, wherein the first primary particle has a plate shape, a needle shape, a cube shape, a rod shape, or a combination thereof, and the second primary particle has a spherical form, a nanowire form, or a combination thereof.

4. The porous silicon-containing composite of claim 1, wherein
   an oxygen content of the porous silicon-containing composite is about 0.1 atomic percent to about 15 atomic percent, with respect to a total content of oxygen, carbon, and silicon atoms.

5. The porous silicon-containing composite of claim 1, further comprising a silicon suboxide of the formula $SiO_x$, wherein $0<x<2$ between the primary particle and the second graphene, and the silicon suboxide has a thickness of about 30 micrometers or less.

6. The porous silicon-containing composite of claim 1, wherein the first primary particle and the second primary particle have different shapes from each other, and
   wherein the porous silicon-containing composite further comprises a third primary particle comprising silicon, the third primary particle having a nanotube shape, a nanorod shape, a nanoribbon shape, or a combination thereof.

7. The porous silicon-containing composite of claim 1, wherein the first primary particle and the second primary particle form a network, or the second primary particle is embedded among the first primary particle.

8. The porous silicon-containing composite of claim 1, wherein a size of the second primary particle is the same as or smaller than a size of the first primary particle.

9. The porous silicon-containing composite of claim 1, wherein the first primary particle has a size of about 20 nanometers to about 180 nanometers, and the second primary particle has a size of about 100 nanometers or less.

10. The porous silicon-containing composite of claim 1, wherein a mixed weight ratio of the first primary particle to the second primary particle is about 1:99 to about 99:1.

11. The porous silicon-containing composite of claim 1, wherein the second graphene has about 1 to about 30 layers, and is disposed on the first primary particle, and
   the second graphene has about 1 to about 5 layers, and is disposed on the second primary particle, and wherein the second graphene disposed on the second primary particle is in the form of flakes and the first graphene is disposed on the second first graphene.

12. The porous silicon-containing composite of claim 1, wherein the second graphene is directly disposed on a surface of a silicon suboxide, and the first graphene is directly disposed on a surface of the porous silicon composite secondary particle, and the porous silicon-containing composite has a double core/shell structure.

13. The porous silicon-containing composite of claim 1, wherein an amount of silicon is about 0.1 parts to about 99 parts by weight, with respect to 100 parts by weight of a total weight of the porous silicon-containing composite, and a total amount of the first graphene and the second graphene is about 0.1 parts to about 2,000 parts by weight, with respect to 100 parts by weight of the silicon.

14. The porous silicon-containing composite of claim 13, wherein the second graphene is disposed about 10 nanometers or less from a surface of the silicon suboxide of the formula $SiO_x$, wherein $0<x<2$, in the silicon composite primary particles, the second graphene comprises 1 to about 30 graphene layers, and has a total thickness of about 0.3 nanometers to about 1,000 nanometers, and the second graphene is oriented at an angle of about 0° to about 90° with respect to a primary axis of the silicon-containing composite, wherein the first graphene is disposed about 1000 nanometers or less from a surface of a silicon suboxide of the formula $SiO_x$, wherein $0<x<2$, in the porous silicon composite secondary particle, the first graphene comprises 1 to about 30 graphene layers, and has a total thickness of about 0.6 nanometers to about 50 nanometers, and the first graphene is oriented at an angle of about 0° to about 90° with respect to a primary axis of the silicon-containing composite.

15. The porous silicon-containing composite of claim 1, wherein the porous silicon-containing composite further comprises a carbonaceous coating layer comprising amorphous carbon on at least one surface of the porous silicon-containing composite, and the carbonaceous coating layer further comprises crystalline carbon.

16. A carbon composite comprising the porous silicon-containing composite of claim 1 and a carbonaceous material.

17. An electrochemical active material composite comprising:
an electrochemical active material; and
the porous silicon-containing composite of claim 1, a carbon composite comprising the porous silicon-containing composite and a carbonaceous material, or a combination thereof,
wherein the porous silicon-containing composite is on a surface of the electrochemical active material.

18. An electrode comprising:
the porous silicon-containing composite of claim 1; or
a carbon composite comprising the porous silicon-containing composite and a carbonaceous material.

19. A lithium battery comprising the electrode of claim 18.

20. The lithium battery of claim 19, wherein the porous silicon-containing composite comprises the first primary particle and the second primary particle after 100 or fewer charge and discharge cycles of the lithium battery, wherein graphene flakes are grown on the second primary particle.

* * * * *